(12) United States Patent
Burt

(10) Patent No.: US 9,658,628 B2
(45) Date of Patent: May 23, 2017

(54) ADVANCED VALVE ACTUATOR WITH TRUE FLOW FEEDBACK

(71) Applicant: Alan Burt, Rockford, IL (US)

(72) Inventor: Alan Burt, Rockford, IL (US)

(73) Assignee: Schneider Electric Buildings, LLC, Andover, MA (US)

( * ) Notice: Subject to any disclaimer, the term of this patent is extended or adjusted under 35 U.S.C. 154(b) by 432 days.

(21) Appl. No.: 14/211,005

(22) Filed: Mar. 14, 2014

(65) Prior Publication Data

US 2014/0261714 A1 Sep. 18, 2014

Related U.S. Application Data

(60) Provisional application No. 61/790,316, filed on Mar. 15, 2013.

(51) Int. Cl.
| | | |
|---|---|---|
| G05D 23/00 | (2006.01) | |
| G05D 23/19 | (2006.01) | |
| F24F 11/06 | (2006.01) | |
| F24D 19/00 | (2006.01) | |
| F24D 19/10 | (2006.01) | |

(52) U.S. Cl.
CPC ..... *G05D 23/1919* (2013.01); *F24D 19/0095* (2013.01); *F24D 19/1015* (2013.01); *F24F 11/06* (2013.01); *Y10T 137/0368* (2015.04); *Y10T 137/1963* (2015.04); *Y10T 137/7759* (2015.04)

(58) Field of Classification Search
None
See application file for complete search history.

(56) References Cited

U.S. PATENT DOCUMENTS

| | | |
|---|---|---|
| 1,558,276 A | 10/1925 | Peterson |
| 1,820,473 A | 8/1931 | Milone |
| 3,369,556 A | 2/1968 | Allderdice |
| 3,636,765 A | 1/1972 | Brown |

(Continued)

FOREIGN PATENT DOCUMENTS

| | | |
|---|---|---|
| CN | 1044978 A | 8/1990 |
| CN | 1420890 Y | 3/2010 |

(Continued)

OTHER PUBLICATIONS

Thomas H. Durkin, "Evolving Design of Chiller Plants," ASHRAE Journal, Nov. 2005, pp. 40-50.*

(Continued)

*Primary Examiner* — Christopher E Everett
(74) *Attorney, Agent, or Firm* — Reinhart Boerner Van Deuren P.C.

(57) ABSTRACT

A valve and actuator assembly that includes a valve configured to control a flow of liquid into a coil or heat exchanger. The valve and actuator assembly further includes a valve actuator configured to control opening and closing of the valve via positioning of a valve closure member. The valve actuator is further configured to provide both a maximum flow rate and a minimum flow rate of the liquid through the valve. In an embodiment, the valve actuator includes a valve closure member position sensor configured to determine the position of the valve closure member based on a flow rate of the liquid through the valve.

26 Claims, 13 Drawing Sheets

(56) References Cited

U.S. PATENT DOCUMENTS

| | | | |
|---|---|---|---|
| 3,761,196 A | 9/1973 | Weinert | |
| 3,880,399 A | 4/1975 | Luthe | |
| 4,028,689 A | 6/1977 | Schopp | |
| 4,036,051 A | 7/1977 | Fell et al. | |
| 4,066,090 A | 1/1978 | Nakajima et al. | |
| 4,108,210 A | 8/1978 | Luthe et al. | |
| 4,149,563 A | 4/1979 | Seger | |
| 4,224,825 A | 9/1980 | Feller | |
| 4,245,501 A | 1/1981 | Feller | |
| 4,250,747 A | 2/1981 | Diprose et al. | |
| 4,277,832 A * | 7/1981 | Wong | G05D 7/0635 137/487 |
| 4,286,613 A | 9/1981 | Lacoste | |
| 4,333,354 A | 6/1982 | Feller | |
| 4,388,003 A | 6/1983 | Feller | |
| 4,393,919 A | 7/1983 | Anderson | |
| 4,403,871 A | 9/1983 | Feller | |
| 4,404,638 A * | 9/1983 | Yada | G01F 15/02 377/21 |
| 4,412,647 A | 11/1983 | Lampert | |
| 4,415,279 A | 11/1983 | Beuse et al. | |
| 4,419,898 A * | 12/1983 | Zanker | G01F 1/90 702/45 |
| 4,469,118 A | 9/1984 | Walters | |
| 4,473,307 A | 9/1984 | Dobronyi et al. | |
| 4,482,006 A | 11/1984 | Anderson | |
| 4,567,915 A | 2/1986 | Bates et al. | |
| 4,581,707 A * | 4/1986 | Millar | G01F 1/00 702/47 |
| 4,635,668 A | 1/1987 | Netter | |
| 4,650,155 A | 3/1987 | Liantonio | |
| 4,657,038 A | 4/1987 | Lyons | |
| 4,679,592 A | 7/1987 | Lamb | |
| 4,694,390 A | 9/1987 | Lee | |
| 4,720,800 A * | 1/1988 | Suzuki | G01F 15/024 377/21 |
| 4,739,794 A | 4/1988 | Ballun | |
| 4,848,389 A | 7/1989 | Pirkle | |
| 4,860,993 A | 8/1989 | Goode | |
| 4,892,114 A * | 1/1990 | Maroney | F16L 55/1022 137/87.03 |
| 4,909,076 A | 3/1990 | Busch et al. | |
| 4,926,903 A * | 5/1990 | Kawai | G01F 1/26 137/486 |
| 5,018,703 A | 5/1991 | Goode | |
| RE33,649 E * | 7/1991 | Kawai | G01F 1/26 137/486 |
| 5,090,436 A | 2/1992 | Hoch, Jr. et al. | |
| 5,113,892 A | 5/1992 | Hull et al. | |
| 5,139,044 A * | 8/1992 | Otten | A01G 25/16 137/62 |
| 5,220,937 A | 6/1993 | Roberts et al. | |
| 5,251,148 A | 10/1993 | Haines et al. | |
| 5,402,822 A | 4/1995 | Brouwer et al. | |
| 5,428,994 A | 7/1995 | Wenzel et al. | |
| 5,553,505 A | 9/1996 | Bignell et al. | |
| 5,573,032 A | 11/1996 | Lenz et al. | |
| 5,643,482 A | 7/1997 | Sandelman et al. | |
| 5,692,535 A | 12/1997 | Walters | |
| 5,758,684 A | 6/1998 | Hudson et al. | |
| 5,775,369 A | 7/1998 | Hagmann | |
| 6,012,294 A | 1/2000 | Utsumi | |
| 6,039,304 A | 3/2000 | Carlson et al. | |
| 6,056,008 A | 5/2000 | Adams et al. | |
| 6,125,873 A | 10/2000 | Brown | |
| 6,155,283 A | 12/2000 | Hansen et al. | |
| 6,161,764 A | 12/2000 | Jatnieks | |
| 6,178,996 B1 | 1/2001 | Suzuki | |
| 6,286,764 B1 | 9/2001 | Garvey et al. | |
| 6,352,106 B1 | 3/2002 | Hartman | |
| 6,370,448 B1 * | 4/2002 | Eryurek | G05B 19/0421 700/19 |
| 6,471,182 B1 | 10/2002 | McIntosh | |
| 6,505,991 B2 | 1/2003 | Roman | |
| 6,534,942 B2 | 3/2003 | Schmidhuber | |
| 6,612,331 B2 | 9/2003 | Cederstav et al. | |
| 6,622,930 B2 | 9/2003 | Laing et al. | |
| 6,655,922 B1 * | 12/2003 | Flek | F04D 15/0209 417/43 |
| 6,663,349 B1 * | 12/2003 | Discenzo | F04D 29/669 417/300 |
| 6,725,167 B2 | 4/2004 | Grumstrup et al. | |
| 6,814,096 B2 | 11/2004 | Vyers et al. | |
| 6,820,631 B2 | 11/2004 | Lehnst et al. | |
| 6,827,100 B1 | 12/2004 | Carlson | |
| 6,837,480 B1 | 1/2005 | Carlson | |
| 6,859,740 B2 | 2/2005 | Stephenson et al. | |
| 6,889,559 B2 | 5/2005 | Gimson | |
| 6,918,402 B2 * | 7/2005 | Harvey | E03B 7/12 137/384 |
| 6,954,683 B2 | 10/2005 | Junk et al. | |
| 7,025,328 B2 | 4/2006 | Ulicny et al. | |
| 7,096,093 B1 | 8/2006 | Hansen et al. | |
| 7,104,461 B2 | 9/2006 | Restivo, Sr. et al. | |
| 7,152,628 B2 | 12/2006 | Folk et al. | |
| 7,166,981 B2 | 1/2007 | Kakutani et al. | |
| 7,178,783 B2 | 2/2007 | Tuin et al. | |
| RE39,658 E | 5/2007 | Carlson et al. | |
| 7,228,869 B2 | 6/2007 | Wilhelm | |
| 7,231,931 B2 | 6/2007 | Lull et al. | |
| 7,246,941 B2 | 7/2007 | Shike | |
| 7,266,427 B2 | 9/2007 | Hansen et al. | |
| 7,434,477 B2 | 10/2008 | Lull et al. | |
| 7,451,781 B2 | 11/2008 | Carlson | |
| 7,637,723 B2 | 12/2009 | Sadasivam | |
| 7,691,652 B2 | 4/2010 | Van Der Wiel | |
| 7,734,572 B2 | 6/2010 | Wiemeyer et al. | |
| 7,797,080 B2 | 9/2010 | Durham, III | |
| 7,798,170 B2 | 9/2010 | Hotz et al. | |
| 2001/0030309 A1 | 10/2001 | Carlson et al. | |
| 2002/0123856 A1 * | 9/2002 | Eryurek | G05B 23/0243 702/140 |
| 2003/0080703 A1 | 5/2003 | Elliott et al. | |
| 2003/0135335 A1 * | 7/2003 | Grumstrup | G05D 7/0635 702/47 |
| 2003/0192595 A1 | 10/2003 | Benson | |
| 2004/0128033 A1 * | 7/2004 | Ku | F16K 37/0083 700/282 |
| 2004/0173261 A1 | 9/2004 | Stoffers | |
| 2005/0039797 A1 | 2/2005 | Carlson | |
| 2005/0092377 A1 * | 5/2005 | Mork | F16K 11/0743 137/597 |
| 2005/0115612 A1 | 6/2005 | Tanaka et al. | |
| 2005/0150552 A1 * | 7/2005 | Forshey | G05D 7/005 137/486 |
| 2005/0273204 A1 * | 12/2005 | Hansen | G05D 7/005 700/282 |
| 2006/0037646 A1 | 2/2006 | Wilhelm | |
| 2006/0234414 A1 | 10/2006 | Van Der Wiel | |
| 2006/0260698 A1 | 11/2006 | Bailey et al. | |
| 2007/0012367 A1 | 1/2007 | Hotz et al. | |
| 2007/0242690 A1 * | 10/2007 | Raghavendra | G05B 19/4185 370/465 |
| 2008/0164006 A1 * | 7/2008 | Karamanos | F24F 1/0059 165/67 |
| 2008/0173838 A1 | 7/2008 | Schmidig et al. | |
| 2008/0307879 A1 | 12/2008 | Borst et al. | |
| 2009/0009115 A1 | 1/2009 | Grogg et al. | |
| 2009/0120515 A1 | 5/2009 | Ohtani et al. | |
| 2009/0171512 A1 | 7/2009 | Duncan | |
| 2009/0260488 A1 | 10/2009 | Kanazawa et al. | |
| 2010/0107755 A1 | 5/2010 | Van Der Weil | |
| 2010/0142535 A1 | 6/2010 | Swainston | |
| 2010/0147394 A1 * | 6/2010 | Trnka | F24D 19/1015 137/12 |
| 2010/0155635 A1 | 6/2010 | Fima | |
| 2010/0251742 A1 | 10/2010 | Tucker et al. | |
| 2011/0126637 A1 * | 6/2011 | DeWall | F16K 1/222 73/861.75 |
| 2011/0153089 A1 | 6/2011 | Tiemann et al. | |
| 2011/0233290 A1 * | 9/2011 | Borovinov | F24D 19/1012 236/93 R |

(56) References Cited

U.S. PATENT DOCUMENTS

| | | |
|---|---|---|
| 2012/0161562 A1 | 6/2012 | Windgassen |
| 2012/0298224 A1 | 11/2012 | Imanari et al. |
| 2013/0240045 A1* | 9/2013 | Feng .......................... G01F 1/56 137/10 |
| 2014/0034145 A1 | 2/2014 | Burt |
| 2014/0097367 A1 | 4/2014 | Burt |

FOREIGN PATENT DOCUMENTS

| | | |
|---|---|---|
| JP | H0658598 A | 3/1994 |
| JP | H06300397 A | 10/1994 |
| JP | 2001271962 A | 10/2001 |
| JP | 2004028476 A | 1/2004 |
| WO | WO 99/54987 A1 | 10/1999 |
| WO | WO 2006/088286 A1 | 8/2006 |
| WO | WO 2012/065275 A1 | 5/2012 |

OTHER PUBLICATIONS

Knowledge is Power—The Belimo Energy Valve™; brochure; known prior to Aug. 6, 2012; 4 pages; BELIMO Americas, Danbury, CT.
Knowledge is Power—Belimo Energy Valve™; presentation; known prior to Aug. 6, 2012; 45 pages.
U.S. Appl. No. 13/710,709, filed Dec. 11, 2012, Burt et al.
U.S. Appl. No. 14/208,118, filed Mar. 13, 2014, Burt.

\* cited by examiner

| Valve Plug Position (Percent Open) | Pgf Plug Geometry Factor for Linear Globe Valve | Dgf Disc Geometry Factor for Rotary Butterfly Valve |
|---|---|---|
| 0% | .822 | 0 |
| 10% | .714 | .011 |
| 20% | .658 | .019 |
| 30% | .647 | .031 |
| 40% | .619 | .058 |
| 50% | .586 | .094 |
| 60% | .558 | .185 |
| 70% | .504 | .254 |
| 80% | .488 | .388 |
| 90% | .438 | .375 |
| 100% | .413 | 0 |

FIG. 9

ADVANCED VALVE ACTUATOR WITH TRUE FLOW FEEDBACK

CROSS-REFERENCE TO RELATED PATENT APPLICATIONS

This patent application claims the benefit of U.S. Provisional Patent Application No. 61/790,316, filed Mar. 15, 2013, the entire teachings and disclosure of which are incorporated herein by reference thereto.

FIELD OF THE INVENTION

This invention generally relates to valves and valve actuators, and more particularly, to valves and valve actuators configured to be controlled electronically.

BACKGROUND OF THE INVENTION

Many types of commercial and industrial systems involve processes in which liquids are supplied via fluid control systems that may include a variety of both pumping assemblies and control valves. These fluid control systems include, but are not limited to, those used in electrical power stations, chemical manufacturing operations, food and beverage processing, liquid gas supply and disposal, water supply and disposal, heating, ventilation, and air conditioning (HVAC) systems, etc. Improving the control mechanisms for the various components of these fluid control systems may reduce energy usage and increase the efficiency of these systems.

In typical conventional fluid control systems, the control valve assemblies provide a feedback signal based on the assumption that the valve's closure member position always follows the valve actuator valve stem position. Generally, there is an assumption that the valve linkage is properly set up and fully operational, even though this may not be the case. Error can be introduced into the system because there is a mechanical linkage between the traditional valve actuator and valve that can introduce an error from backlash, movement hysteresis, or malfunction. Typically, fluid control valve assemblies provide the position of the valve stem. However, if the water flow is non-linear relative to the valve stem position, the position feedback signal may not indicate the percentage of fluid flow through the valve.

Typically, flow meters are physically piped in series to measure the fluid flow volume through the valve, and are usually located externally to the valve body. These flow meters may be used in industrial and/or HVAC applications.

Embodiments of the present invention represent an advancement over the state of the art with respect to fluid control systems and the control thereof. These and other advantages of the invention, as well as additional inventive features, will be apparent from the description of the invention provided herein.

BRIEF SUMMARY OF THE INVENTION

In one aspect, embodiments of the invention provide a valve and actuator assembly that includes a valve configured to measure and control a flow of fluid into a coil or heat exchanger, and a valve actuator configured to control opening and closing of the valve via positioning of a valve plug or closure member. The valve actuator can be further configured to provide both a maximum flow rate and a minimum flow rate of the liquid through the valve. In an embodiment, the valve actuator includes a valve closure member position sensor configured to determine the flow volume of the fluid through the valve from the position of the valve closure member and other sensed inputs.

In a particular embodiment, the communications module is configured to communicate with a building management system (BMS) over a serial communications bus. Signals from the BMS may be retentively stored by the valve actuator, allowing the valve actuator to function properly if communication with the BMS is lost. Further, the valve actuator is configured such that its operation can be synchronized with the BMS, and with a building's mechanical heating, cooling, and pumping systems to increase energy efficiency of the building's HVAC system. A building management system implemented using a communications network is disclosed in U.S. Patent Publication No. 2010/0142535, the teachings and disclosure of which is incorporated herein by reference thereto.

In certain embodiments, the valve actuator includes a calculation of fluid flow volume based on the dynamic actuator force required to position the valve's linear movement closure member, the position of the valve closure member, and known dimensional and geometric properties of the valve. In other embodiments, the valve actuator includes a calculation of fluid flow volume based on the dynamic actuator torque required to position the valve's rotary movement closure member, the position of the valve closure member, and known dimensional and geometric properties of the valve. In still other embodiments, the valve actuator includes a calculation of fluid flow based on the differential pressure across the valve's inlet to outlet as sensed by two separate absolute pressure sensors or a single differential pressure sensor, the position of the valve closure member, and known geometric properties of the valve. In yet other embodiments, the valve actuator has a communications module configured to facilitate communication with the valve actuator over a network, and further configured to allow both remote monitoring of the flow through the valve, and remote control of the valve actuator. The valve closure member position sensor may be coupled to the communications module such that data from the valve closure member position sensor can be accessed remotely.

In at least one embodiment, the valve actuator also includes an internal fluid temperature sensor, an optional flow rate meter, a second fluid temperature sensor sensing the fluid temperature at another location in the piping system, and data from the internal temperature sensor, optional flow rate meter, and second fluid temperature sensor is accessible either locally or remotely.

In a further embodiment, the valve actuator includes a zone air temperature controller that determines a position for the valve actuator based on a sensed zone temperature and a desired zone temperature, wherein the position for the valve actuator is verified based on data from the valve closure member position sensor. In some embodiments, the valve actuator has a plurality of adjustable operating parameters, and the plurality of adjustable operating parameters can be adjusted either locally or remotely. The plurality of adjustable operating parameters may include an integral setting for the zone air temperature controller, wherein the integral setting provides positive or negative adjustment factors for the valve actuator to determine a correct the position for valve actuator closure member when the actual flow rate through the valve does not match the desired flow rate through the valve. Further, the plurality of adjustable operating parameters may include a derivative setting for the zone air temperature controller, wherein the derivative setting provides positive or negative adjustment factors for the valve actuator to determine a correct the position for valve actuator closure member in the event of an abrupt change to the flow rate through the valve.

The valve actuator may further comprise an anti-cavitation module configured to determine if the fluid flowing through the valve is likely to cavitate, wherein the anti-cavitation module determines a likelihood that cavitation in the valve will occur based on fluid temperature in the valve, valve inlet pressure, and valve outlet pressure, and wherein data from the valve closure member position sensor is used to adjust the flow rate of fluid through the valve to prevent cavitation. Further, the valve actuator may comprise a diagnostics module configured to provide diagnostic information on operation of the valve and actuator assembly to a remote location, wherein the diagnostics module provides diagnostic information regarding an actual flow rate through the valve versus a desired flow rate through the valve.

In a particular embodiment, the valve actuator has a motor and geartrain coupled to the closure member by a linkage assembly, and a circuit board having control circuitry to regulate operation of the motor and geartrain, and communications circuitry to enable the actuator to communicate with a building management system via a serial communications bus. The valve actuator may also be configured to operate the valve as either a pressure-independent valve or a pressure-dependent valve.

In particular embodiments, the valve actuator has a plurality of adjustable operating parameters, whose values control the operation of the valve actuator. Further, the plurality of adjustable operating parameters can be adjusted either locally or remotely.

In another aspect, embodiments of the invention provide a method of calculating a fluid flow rate through a valve. The method includes the steps of storing a static force or torque value for a valve closure member in a memory of a valve actuator, and using the stored static force or torque value to calculate a value for dynamic force or torque on the valve closure member. The method further includes determining a plug geometry factor and storing the geometry plug factor in the memory of the valve actuator, determining the valve plug position via a valve plug position sensor, and calculating the fluid flow rate using the dynamic force or torque value, the plug geometry factor, and the valve plug position. Further, the method includes comparing the fluid flow rate to a calculated minimum flow rate for freeze protection, and adjusting valve operation when the fluid flow rate is below the calculated minimum flow rate for freeze protection.

In particular embodiments, the valve closure member moves linearly between an open position and a closed position, and the method further includes calculating a plug seating force value, storing the plug seating force value in the memory of the valve actuator, and using the plug seating force value and the static force value to calculate the dynamic force value. In more particular embodiments, determining a plug geometry factor is done by means of a lookup table stored in the memory of the valve actuator, or by means of a polynomial based on a variables expression of valve stem positions.

In other embodiments, the valve closure member moves rotationally between an open position and a closed position. The method may also include storing one or more dimensions for the valve closure member in the memory of the valve actuator, storing a bearing friction factor in the memory of the valve actuator, and using the one or more stored dimensions, the stored bearing friction factor, and the static torque value to calculate the dynamic torque value.

In yet another aspect, embodiments of the invention provide a method of calculating a fluid flow rate through a valve. The method includes the steps of determining a pressure differential between an inlet of a valve and an outlet of the valve, calculating a flow coefficient factor based on a position of the valve closure member, and calculating the fluid flow rate using the low coefficient factor, and the pressure differential. The method further includes comparing the fluid flow rate to a calculated minimum flow rate for freeze protection, and adjusting valve operation when the fluid flow rate is below the calculated minimum flow rate for freeze protection.

In a particular embodiment, the method further includes measuring a temperature of a fluid flowing through the valve, using the temperature to determine a specific gravity of the fluid, and using the specific gravity to calculate the fluid flow rate.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 9 is a table showing typical globe valve and butterfly valve geometry factors;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

While, in many of the examples and embodiments presented herein, the present invention is described with respect to its application in an HVAC system. However, one of skill in the art will recognize that the scope of the present invention is not limited to HVAC systems. As referenced above, embodiments of the invention may be used in a variety of fluid control systems found in operations that include, but are not limited to, electrical power stations, chemical manufacturing operations, food and beverage processing, liquid gas supply and disposal, water supply and disposal, etc. Nothing in the exemplary embodiment described below is intended to limit the scope and applicability of the present invention. It should also be noted that the terms "valve plug" and "valve closure member" are used interchangeably in this application with respect to linear movement valves, such as globe valves. In other instances, for example with respect to rotary movement valves such as butterfly valves, "valve disc" and "valve closure member" are used interchangeably.

Figure 1:
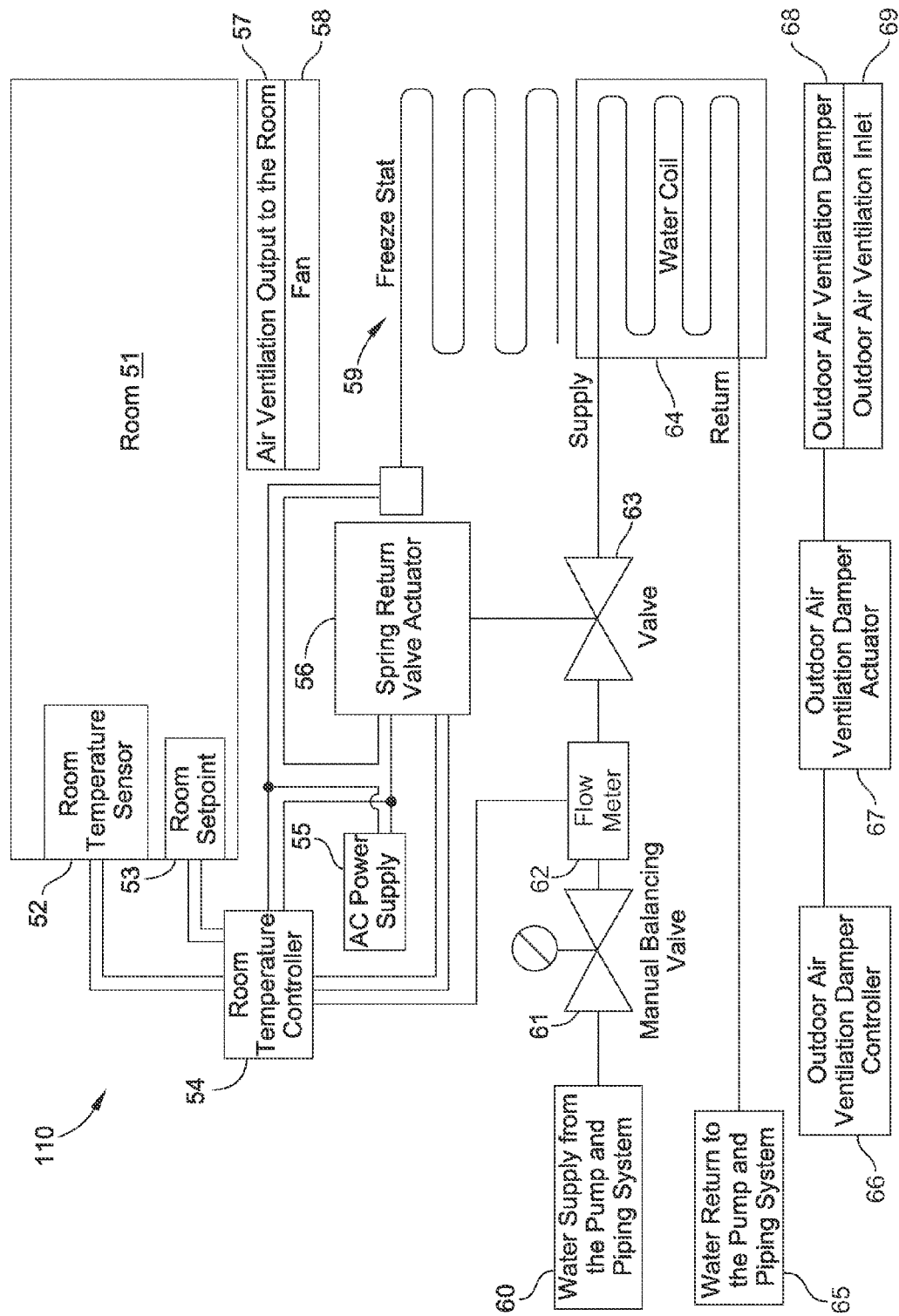
FIG. 1 is a schematic diagram of a prior art HVAC valve configuration with water coil freeze protection.

FIG. 1 is a schematic illustration showing an embodiment of HVAC systems provided in the prior art. For example, FIG. 1 is a schematic diagram showing a conventional HVAC system 110 that requires multiple devices to obtain the required water valve control and water coil freeze protection. The source of the hot and cold water for the water supply from the pump and piping system 60 is generally located outside of the room 51, and is usually a centralized supply consisting of one or more boilers or chillers (not shown) that can be alternately connected within the source. The valve 63 modulates the flow of hot and cold water from the water supply from the pump and piping system 60 for heating and/or cooling of the room 51. Typically, the valve 63 is mechanically driven by the spring return valve actuator 56 that is operatively connected in accordance with the control signal provided by the room temperature controller 54.

In typical embodiments, the room temperature controller 54 receives a temperature sensing signal from the room temperature sensor 52 and compares it to the desired room temperature setpoint that is provided by the room setpoint device 53, which can be a potentiometer or keypad, for example. The flow meter 62 can optionally be used by the room temperature controller 54 to provide flow information for indication purposes, for optional flow volume control rather than by conventional temperature control, or for energy calculation with the addition of supply and return water temperature sensors.

In the embodiment shown, the spring return valve actuator 56 operates from a proportional control signal received from the room temperature controller 54 to manually position the valve 63 from full closed to full open to maintain the desired room setpoint as provided by the room setpoint device 53. The room 51 air temperature is controlled by having air pass through a water coil 64 with an appropriate volume of hot or cold water to provide the necessary temperature differential between the water coil 64 temperature and the room 51 temperature to drive the room 51 temperature toward the desired room setpoint device 53. The water coil 64 uses hot or cold water that is provided by the central boiler and chiller system, for example, delivered by the water supply from the pump and piping system 60. Generally, each room has its own piping system. When it is desired to operate the systems in the heating mode, the water supply from the pump and piping system 60 provides hot water, from a boiler for example, and when it is desired to operate the system in the cooling mode, the water supply from the pump and piping system 60 provides cold water, from a chiller for example.

The outdoor air ventilation inlet 69 and outdoor air ventilation damper 68 are used to provide fresh air to the room. The volume of fresh air is controlled by the outdoor air ventilation damper controller 66 which mechanically positions the outdoor air ventilation damper actuator 67. There are a number of damper actuator control methods that are commonly used. With all methods there is a risk that cold outdoor air can freeze the water in the water coil 64 and cause significant property damage. Common outdoor air damper issues include damper blades that do not close tightly due to wear, warping, or other damage, loose or damaged mechanical linkages, and actuator failure.

Figure 2:
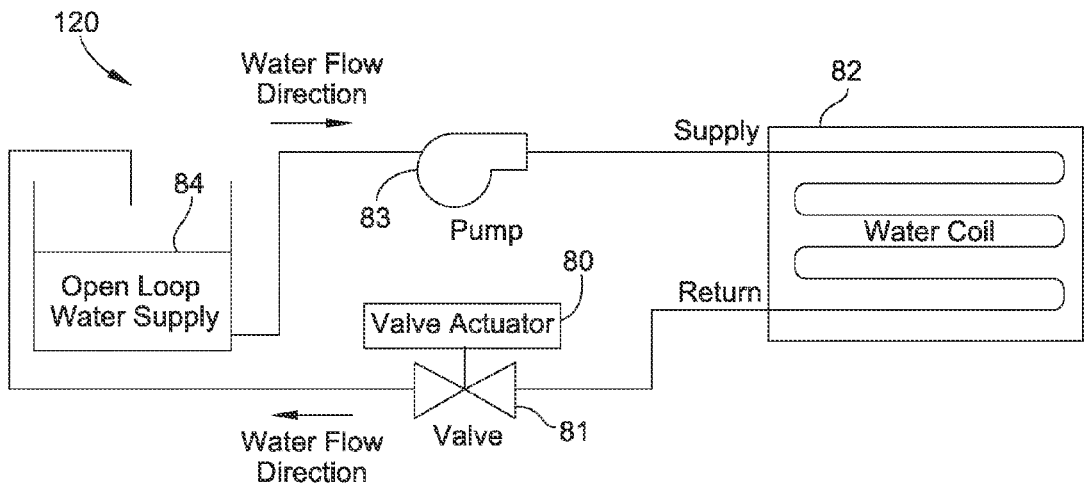
FIG. 2 is a schematic diagram of a HVAC valve and coil locations for an open loop water system.
Figure 3:
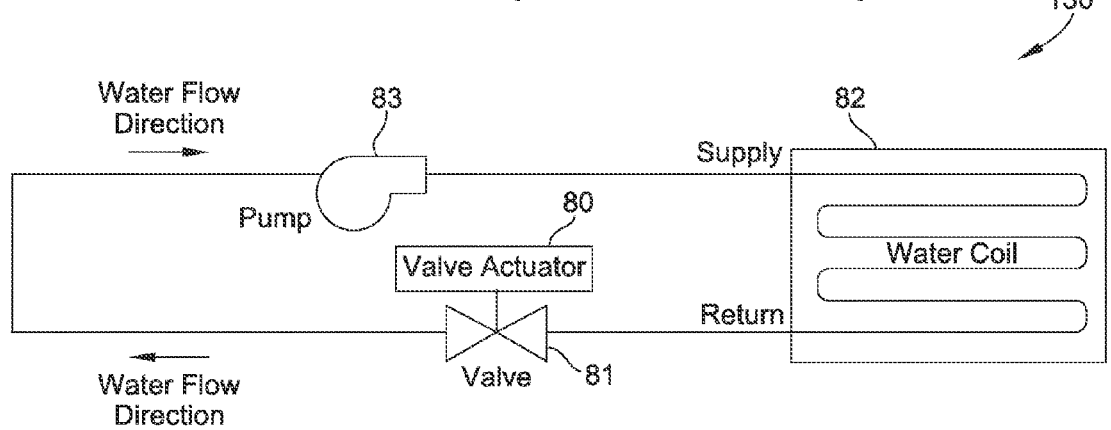
FIG. 3 is a schematic diagram of a HVAC valve and coil locations for a closed loop water system with the valve on the return side of the coil.
Figure 4:
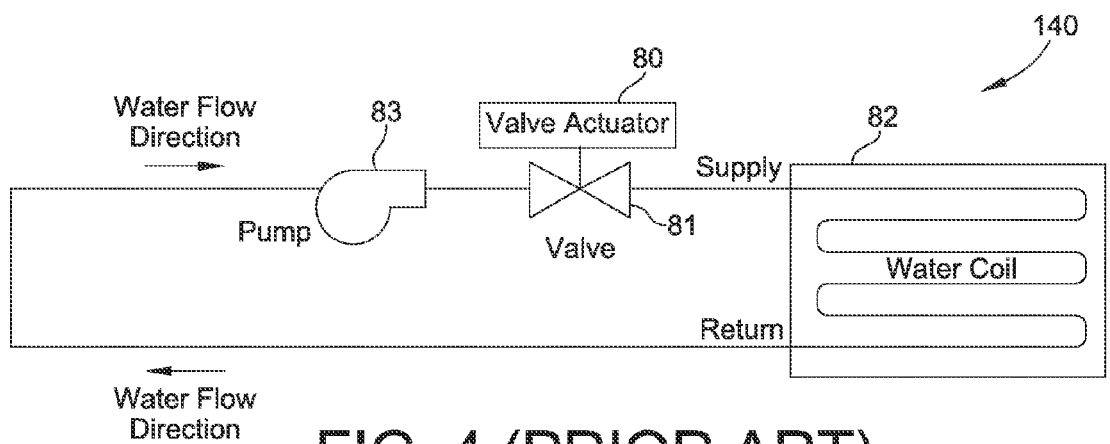
FIG. 4 is a schematic diagram of a HVAC valve and coil locations for a closed loop water system for the valve on the supply side of the coil.

Piping systems can either be open loop systems 120, such as the one shown in FIG. 2, or closed loop systems 130, 140, like those shown in FIG. 3 and FIG. 4, respectively. With the open loop system 120 of FIG. 2 for example, the valve actuator 80 and valve 81 must be on the return side of the water coil 64, 82 to ensure that the water coil 82 tubes are full of water to obtain good heat transfer because open loop systems typically have a large amount of air in the system that can interfere with the heat transfer. With closed loop systems 130, 140, the valve actuator 80 and valve 81 can be on the return side of the of the water coil 82 as shown in FIG. 3 or can be on the supply side of the water coil 64, 82 as shown in FIG. 4.

Having the closed loop valve actuator 80 and valve 81 on the supply side of the of the water coil 64, 82, as shown in FIG. 4, will work but will have a higher probability of having air in the water coil 64, 82 that will interfere with the heat transfer. With the closed loop valve actuator 80 and valve 81 on the return side of the of the water coil 64, 82, as shown in FIG. 3, thermal transfer will be better with less air in the water coil 64, 82, but there is a higher risk of fluid in the water coil 64, 82 freezing. This is because air is compressible, and systems with more air in the water coil 64, 82 are able to absorb some of the increased pressures resulting from a freeze condition due to the aforementioned compressibility of the air. Water in systems having less air in the water coil 82 are more prone to freeze conditions Not surprisingly, the probability of a coil freeze condition is most likely to occur in the heating mode because the outdoor air temperature is cold. For water in the water coil 64, 82 to freeze, there water therein must be somewhat stationary and exposed to cold temperatures for a period of time sufficient to lower the water temperature below 32° F. (0° C.). When the outdoor air temperature is very cold, the room temperature is likely to be cold and the valve at least partially open, which can reduce the possibility of a water coil freeze condition.

With milder outdoor air temperatures that are below 32° F. (0° C.) but not cold enough to necessarily cause the room 51 temperature to be uncomfortably cold, there can be a significant risk of water in the water coil 64, 82 freezing, since the valve 63 may be closed because the room 51 does not require heat such that the water in the water coil 64, 82 is not flowing, thus giving rise to a potential freeze condition.

With the conventional HVAC system 110 shown in FIG. 1, a freeze stat 59 is wired in series with the spring return valve actuator 56. When the freeze stat 59 detects a potential freeze condition, it will discontinue power to the spring return valve actuator 56, which, in some instances, has an internal spring mechanism to drive it to a known position upon loss of power. It is often the case that this known position is the fully open valve position, such that the valve 63 protects the water coil 64 and piping system from freezing, even if a lower volume of flow would be adequate to prevent the freeze condition. This approach tends to waste energy. In some cases, the freeze stat 59 may also provide power to the outdoor air ventilation damper actuator 67, which may also have spring return operation to close off the outdoor air ventilation damper 68 if the freeze stat 59 detects a potential freeze condition.

Freeze stats 59 are usually available with automatic reset or manual reset. After sensing cold air temperature, a manual reset freeze 59 stat remains open and provides full valve flow until the freeze stat 59 has been identified and manually reset. An automatic reset freeze stat 59 will automatically reset if the air temperature decreases below freezing and then warms up above freezing. This eliminates the need for the user to reset the freeze stat 59, but typically does not alert the user that there may be a problem with the outdoor air ventilation damper controller 66, outdoor air ventilation damper actuator 67, or outdoor air ventilation damper 68. The type of freeze stat 59 selected is generally based on the aforementioned trade-offs between the manual reset and automatic reset technologies. The manual reset freeze stat 59 requires the user to reset the device, which requires more labor and can waste energy before reset occurs, while the automatic reset freeze stat 59 requires less labor but can delay the identification of a damper-related problem that can cause future problems.

Still referring to FIGS. 1-4, the ability of the freeze stat 59 to properly protect the water coil 64 is dependent upon the proper installation of the freeze stat 59, the length of the freeze stat 59 relative to the area of the water coil 64, and any air movement stratification across the water coil 64 as a result of any outdoor air ventilation inlet 69 whose temperature may be improperly sensed by the freeze stat 59. Almost all building HVAC specifications require that there shall not be less than one lineal foot of freeze stat capillary length per square foot of water coil water surface area.

In particular embodiments, the freeze stat 59 is mounted close to the water coil 64 in a symmetrical pattern that provides uniform coverage with equal spacing across the full length and width of the water coil 64. The freeze stat 59 typically would be located in the air stream at the output of the water coil 64 as shown in FIG. 1. Some systems may have a second water coil between the water coil 64 and the fan 58 and air ventilation output to the room 57 to provide both heating and cooling. These systems with two coils would have the freeze stat 59 located after the first water coil 64 typically used for heating and before the second coil typically used for cooling located before the fan 58 and air ventilation to the room 57. These systems with two coils would also have their necessary valve, valve actuator, manual balancing valve, water supply from the pump and piping system, and room temperature controller to provide sequenced operation with the thermal transfer provided by both water coils. While there are several other variations of coil configurations in systems with one, two, or more coils, the freeze stat 59 will not be located further downstream from the output of the closest coil located near the outdoor air ventilation damper 68 and outdoor air ventilation inlet 69.

The length of the freeze stat 59 capillary should be such that it allows proper representation of the water coil's full length and width, as too short a capillary will not properly cover the water coil 64, and too long a capillary will cause unequal representation from a non-symmetrical pattern. Generally, the freeze stat 59 capillary has to be carefully mounted using bends with minimum radius of 3" (76 mm) with support clips to avoid cracking the capillary which will cause eventual failure. Since the freeze stat 59 is only available with a few available capillary lengths this issue of matching the freeze stat length to the water coil area is a frequent occurrence. Many building HVAC specifications require a minimum element length of 25 feet (762 cm) with the capability of tripping if any on foot (30 cm) section drops below the freeze stat setpoint in an attempt to obtain more accurate freeze protection.

The freeze stat 59 mounting with a symmetrical uniform pattern across the coil is based on the assumption that the air flow across the water coil 64 is consistent throughout its full length and width. In reality this may not be true if air stratification exists due to the angle or pattern of the outdoor air ventilation damper 66 blades, outdoor wind turbulence, or wind gusts caused by the shape of the building and adjacent buildings and objects and direction of the wind. Typically, the freeze stat 59 is designed to sense the average temperature throughout its capillary and trigger its two-position relay output in the event that the temperature is too cold, but does not fully compensate for a large degree of stratification causing sections of the water coil 64 and the freeze stat 59 capillary to be at different temperatures.

It is desirable to provide art apparatus to overcome the sensing problems highlighted above and to also provide installation savings by having fewer components to purchase, mount, wire, and test than with the traditional HVAC systems. The conventional systems, such as that shown in FIG. 1, operate under the assumption that the water coil 64 temperature always follows the nearby air temperature and that the freeze stat 59 accurately senses the air temperature. A short duration cold temperature can force the freeze stat 59 to sense a cold temperature even if the water temperature is above freezing causing a false freeze condition and wasting energy. Some HVAC design engineers try to minimize false freeze detection with limited success by adding time delay relays with delays of 0.5 to 5 minutes to prevent spurious freeze stat trips.

An inaccurate freeze stat 59 with a low side sensing error can also prematurely force the valve full open if the water is above freezing and waste energy especially with a manual reset freeze stat that may stayed tripped for a long period of time until it is manually reset. Conversely, an inaccurate freeze stat 59 with a high side sensing error can incorrectly fail to sense a true freeze condition resulting in extensive water coil 64 and building damage. Most freeze stats have field adjustable trip point settings, and are not always properly set to represent a freeze condition. Some HVAC engineers specify a trip setpoint of 38° F. (3° C.) with the assumption that the freeze stat 59 capillary temperature follows the water temperature and that a 38° F. (3° C.) setting will protect the coil and not trip too early.

An alternate approach to achieving freeze protection in HVAC coils 63 in closed loops is the addition of an anti-freeze to prevent the rigid pipes and coils from undergoing physical stresses, deformation, and rupture due to the expansion that occurs when water turns to ice. Compounds are added to the water to reduce the freezing point of the mixture below the lowest temperature the system is likely encounter. The most frequently used anti-freeze compounds for HVAC closed loop systems are ethylene glycol and propylene glycol. One of the most important characteristics of glycol is its viscosity because of its influence on the ease of pumping and its impact on heat transfer. Viscosities of glycols vary inversely with temperature. Hot glycols flow freely, but their viscosities increase as they cool until they eventually set and no longer flow. Glycol water mixtures are more viscous than water alone and their viscosities become greater as the glycol content is increased, or if the water mixture temperature is lowered.

Ethylene glycol has a lower cost, lower viscosity, and better heat transfer properties than propylene glycol. However, ethylene glycol is not as environmentally friendly as propylene glycol due to its moderate toxicity. The proper concentration of glycol to water is required to obtain the desired freeze protection level with higher concentrations of glycol by volume lowering the freezing points of the system.

Figure 5A:
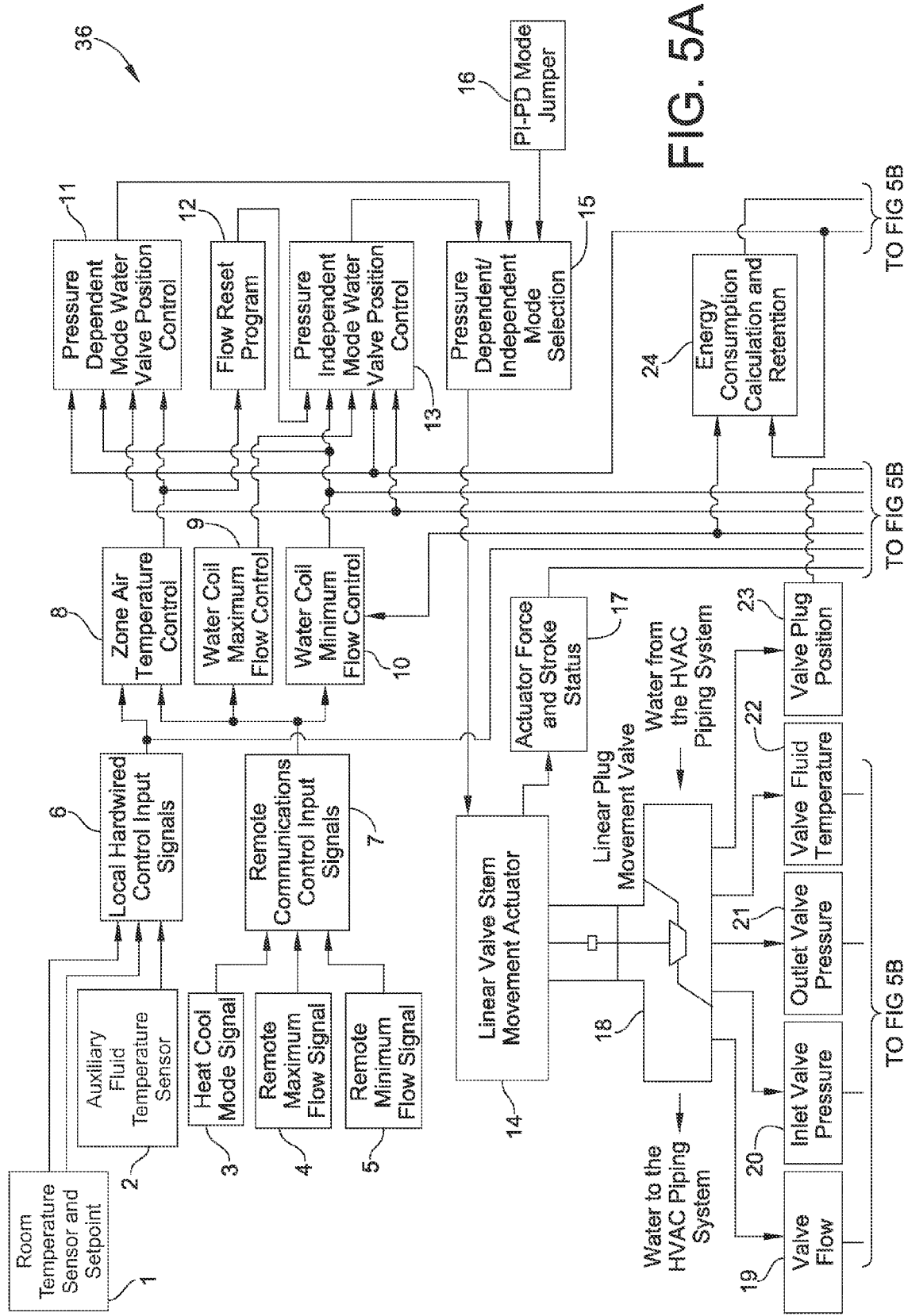
FIGS. 5A and 5B are schematic block diagrams of an HVAC system and integrated valve and actuator assembly, constructed in accordance with an embodiment of the invention.
Figure 5B:
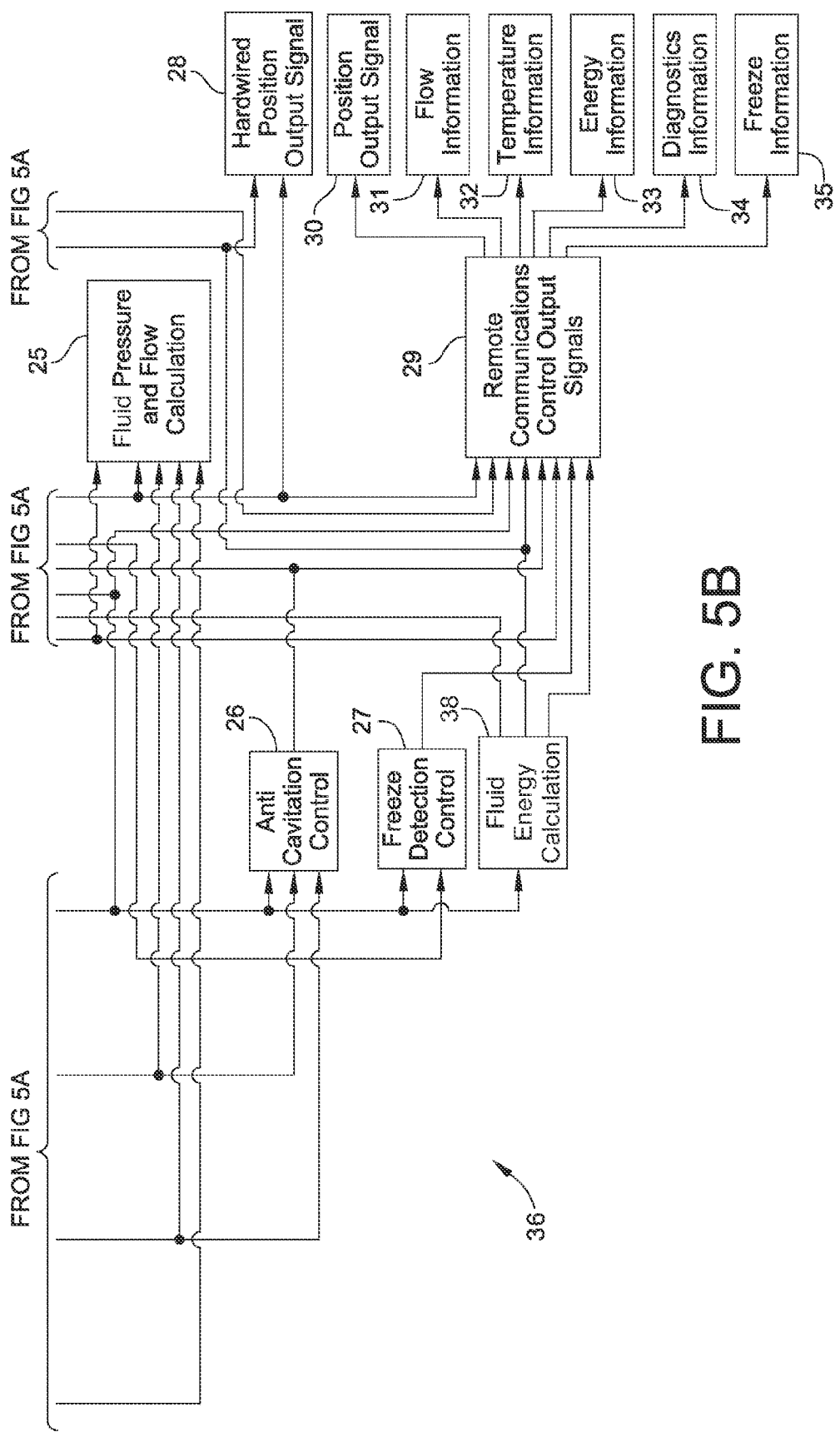

The schematic diagrams of FIGS. 5A-10, which will be described below, illustrate various improvements over the prior art. In accordance with an aspect of the invention illustrated in the schematic diagram of FIGS. 5A and 5B, a valve and actuator assembly 36 includes a valve 18, an actuator 14, a room temperature controller 8, a fluid temperature sensor 22, a flow rate sensor 19, and freeze detection controller 27 in one integral assembly that is much faster to install because only one device has to be mounted and wired, rather than multiple separate devices, as with the system 110 of FIG. 1. The embodiment of FIGS. 5A and 5B also show that the valve 18 includes and inlet valve pressure sensor 20 and an outlet valve pressure sensor 21 so that the pressure drop across the valve 18 can be obtained. FIGS. 5A and 5B show the invention with the valve and actuator assembly 36 having the entire functionality of several traditional devices, all requiring individual mounting and interconnective wiring. The valve and actuator assembly 36 can be field-configured to operate as a pressure-dependent or a pressure-independent valve, and will provide energy efficient freeze protection in either valve control mode.

Control valves throttle the flow of a fluid by having their closure members move in their valve bodies to block the fluid flow at one end of movement and open the flow at the other end of movement. The closure member may be referred to as a plug for a globe valve, a disc for a butterfly valve, a ball for a ball valve, or other terms unique to the valve type. The valve closure member has contact with the valve seat to block water flow. As the valve closure member opens the fully blocked valve seat starts to open toward its maximum area. Valve seats are usually round, and their flow volume capacity when fully open can be expressed by:

$$Q=V2.44799377 Vsd^2$$

Q=Flow in GPM
V=Fluid Velocity in Feet per Second
Vsd=Valve Seat Diameter in Inches The valve closure member may have a variety of shapes either symmetrical or unsymmetrical, and is connected to a stem and seal that exits the valve body to allow an actuator located outside the valve to position the valve stem and closure member. The seal is designed to have secure contact with the valve body stem and the valve body stem outlet such that it prevents fluid from leaking out of the valve while the valve is operating at its rated static and differential pressure ratings. Some control valves, such as globe and gate valves, require linear stem movement to fully open to close the fluid flow and other types, such as ball, butterfly, and shoe valves, require rotary movement to fully open and close the fluid flow.

Figure 7:
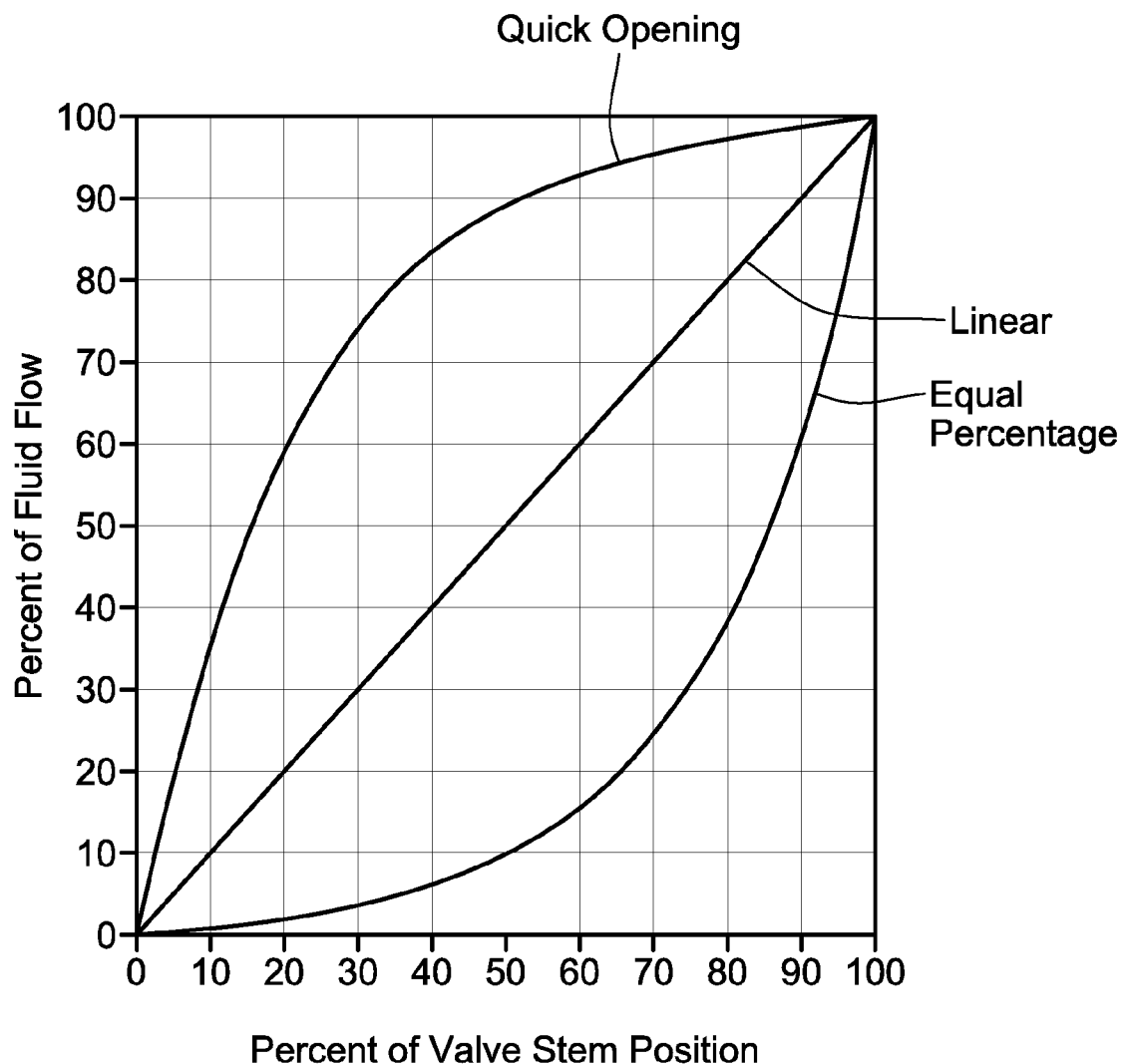
FIG. 7 is a graph showing common relationships between valve stem position and fluid flow.

A valve's flow characteristic is the relationship between the flow rate through the valve and the valve stem position. The two most common proportional flow control characteristics used with fluid control systems are linear and equal percentage as shown in FIG. 7. The inherent flow characteristics are based on a constant pressure drop across the valve. For linear flow valves, the flow is directly proportional to valve stem position, and can be expressed by:

$$f(x)=x$$

f(x)=Valve Flow Capacity Percentage (0 to 100% of Valve's Cv Rating)
x=Valve Stem Position (0 to 100%)

For equal percentage flow valves, the flow increases an equal percentage of the previous flow for every equal step change in the valve stem movement. The change of flow with respect to valve stroke will be relatively small when the valve closure member is near the valve seat and relatively large when the valve closure member is nearly wide open. Equal percentage flow valves provide precise control in the first half of the valve stem movement where the valve closure member must provide small changes in heat transfer to control the process and high fluid flow capacity in the second half of the valve stem movement when a high flow volume is required due to a high heat transfer requirement. Equal percentage flow curves can be expressed by:

$$f(x)=\alpha^{x-1}$$

f(x)=Valve Flow Capacity Percentage (0 to 100% of Valve's Cv Rating)
α=Valve's Rangeability (Valve's Rated Cv/Minimum Controllable Flow)
x=Valve Stem Position (0 to 100%)

The flow of quick or fast opening valves rapidly increases as the valve closure member is positioned above the valve seat. Maximum or near maximum flow is achieved well before the valve closure member is full open. Quick opening valves typically are used for binary on/off applications because the valve closure member quickly passes through the interim flow positions. Other non-linear proportional control valve flows exist with some valve designs and for some special applications such as hyperbolic flow valve curves with a shallower curve than equal percentage valves which provides flow variation that varies as the square of the pressure drop. Square root curves are steeper than linear curves and shallower than quick opening curves to provide fast acting proportional control. The shape and height to width ratio of the closure member determines the valve's flow characteristic. Due to geometric differences of the valve closing member, valve seat, and inlet and outlet ports the actual valve flow curves may not always conform to their theoretical mathematic equivalents for a particular valve design or valve size.

The inherent flow characteristic is valuable in describing the valve's designed flow characteristic, however, few valves operate at a constant pressure drop. The change in the pressure drop across the valve comes from two main causes. The characteristic of pumps, which result in an increased pump pressure head as the flow is reduced. The reduction in line losses as flow is reduced, causes more and more of the pump head to appear across the valve. The increase in the pressure drop across the valve as it decreases the flow changes the valve inherent flow characteristic. The new characteristic is called the installed flow characteristic. The increase in pressure in pressure drop across a valve shifts the inherent curves upward. The smaller the pressure drop of the valve as compared to the total system drop, the higher the inherent curve is shifted. An open piping system type such as shown in FIG. 2 will have less back pressure on the valve's outlet or downstream or outlet port than a closed system shown in FIG. 3 and FIG. 4 and will have a consequential different installed flow curve.

Actuators are available with linear output movement and with rotary output movement. Although it is easiest to use linear movement actuators with linear stem movement valves and rotary movement actuators with rotary stem movement valves, it is possible to convert an actuator's movement type with a mechanical linkage such that you can use a rotary output actuator with a linear stem movement valve or a linear movement actuator with a rotary stem movement valve. Mechanical linkages are also frequently used to connect the actuator on the valve's bonnet or shoulder and attach to the valve stem with alignment such that the actuator movement fully strokes the valve stem from both ends of travel including allowances for mechanical part and installation variations.

Linear actuators provide mechanical work from force acting through a linear movement and rotary actuators provide mechanical work through a rotating or circular movement. Torque has dimensions of force times distance, and is the cross product of the lever arm distance and force that can be expressed as:

$$T=LF$$

T=Torque in pound-inch (lb.-in), two dimensional
L=Position length of the fulcrum movement arm in inches
F=Force in pounds, perpendicular to L When the vectors between the fulcrum and lever arm are not perpendicular the cross product of the lever arm distance force that can be expressed as:

$$T=LF \sin \theta$$

T=Torque in pound-inch (lb.-in)
L=Position length of the fulcrum movement arm in inches
F=Force in pounds, perpendicular to L
θ=Angle between Vectors L and F Dynamic torque involves acceleration and static torques do not. When torque is transmitted at a constant speed with rotation the torque is rotating static torque because there is no acceleration. Static torques are parasitic and are induced as a result of bearings, contact surface material component frictions, and components with large rotational inertias. Torque measurement may be achieved by an in-line sensor between torque carrying components. Multiple in-line sensors can be appropriately placed between multiple torque producing and torque parasitic components to separate torque measurements. Torque can be measured by sensing the actual rotating output shaft deflection occurring as a result of a twisting force as the torque experiences some tension and compression as a result of the deflection. Torque measurements sensors include, but are not limited to, the following types.

Rotating strain gauges can be powered with slip rings or with an inductively coupled non-contact transformer. Their resistive Wheatstone bridge outputs may consist of two gauges in tension and two gauges in compression, which utilize signal conditioning electronics to provide temperature compensated output torque signals. Stationary mounted strain gauges can also be used, but with less accuracy, as their sensing does not capture the inertia of the motor.

Piezoelectric sensors consisting of crystalline quartz or other polycrystalline ceramic materials are positioned on adjacent surfaces to provide an electrical charge when strained by external forces. When force is applied to the sensor materials an electrostatic charge is generated proportional to the input force. The output is collected on electrodes between the adjacent surfaces and then routed to external signal amplifiers. Piezoelectric materials can only measure dynamic movements and not continually static events.

Acoustic wave sensors utilize modulated surface acoustic waves propagated through the surface material to detect torque, pressure, strain, temperature, or mass. Acoustic wave sensors consist of two piezoelectric photo lithographically etched substrates. The first substrate is the input interdigitated transducer that converts electric field energy into mechanical wave energy that propagates through the substrate. The second substrate is the output interdigitated transducer that converts mechanical energy back to electrical energy. Any changes that occurred to the mechanical wave are a result of physical stimulus and will be reflected by the output interdigitated transducer.

Magnetoelastic sensors utilize the Villary Effect to provide magnetic signals that are electronically conditioned to provide output torque signals. With the Villary Effect when magnetoelastic material is compressed, bent, twisted, or elongated its magnetization characteristics changes with the degree of movement.

Analog and digital telemetry torque sensors provide contactless methods of receiving a torque signal from a rotating resistive bridge sensor with signal conditioning electronics. A rotating transformer is used to power a circuit on the rotating sensor that excites a strain gage bridge and digitizes the sensor output by means of ultra violet light to a stationary receiving light detection device.

Electrically operated actuators used for driving loads, such as valves, typically have gears, pulleys, or chain/sprocket drive components to change the motor's speed, torque, and movement range. Gears are more compact than pulleys, chains, belts, or sprockets, and are frequently used in damper and valve actuators because they provide a compact, less expensive, actuator package that is easier to install in tight areas. Like pulleys, chains, and sprockets, the gears provide mechanical advantage through a gear ratio allowing a small sub fractional horsepower electric motor to drive a higher torque rotary load or a higher force linear load. The final output gear is then meshed with a output mechanism which is mechanically connected to the valve stem. Forward and reverse rotation sub fractional horsepower brushed DC, multi phased brushless, synchronous, stepping, and other motors electric motors can contain an integral Application Specific Integrated Circuit (ASIC) to provide them the capability to generate a torque output signal. The motor may include a motor, ASIC, and torque sensor such as acoustic wave sensor with two interdigitated transducers or a magnetoelastic sensor such as magnetic hall sensing of the angular shift angle displacement between two rotating shafts linked by a torsion bar. The motor may alternately include a motor, ASIC and motor monitoring circuitry that calculates the torque by inference such as determining the torque as a cross product of the estimated stator flux linkage vector and measured motor current vector.

Strain gauges, magnetoelastic, and other torque sensors can alternately be constructed with different physical constructions to measure force by modification of their axis and angle of movement. When a torque is applied to a rotating shaft the shaft twists by a small amount. The twisting produces an elongation or stretch in the shaft material. The elongation is at an angle of 45 degrees to the shaft axis and occurs with a simultaneous compression in the opposite 45 degree direction.

Some valve types, such as globe, gate, and butterfly valves, require a high rotary actuator torque or high linear actuator force to fully close the valve closure member and obtain their rated seat leakage. It is desired to have as low a seat leakage as possible to avoid energy losses caused by fluid leakage through the valve and obtain more accurate temperature control. Valves are rated to provide a maximum seat leakage that is usually expressed as a percentage of their rated flow coefficient. The Fluids Control Institute (FCI) Standard ANSI/FCI 70.2 defines six levels of seat leakage and the European Standard 1349 Industrial Process Valves defines eight levels of seat leakage.

Some valves have metal to metal sealing contact surfaces between the valve closure member and seat that require high forces if the two surfaces are not fully uniform and consistent. Other valves with elastomer seals may require even higher forces because the elastomer must be fully compressed to reduce the seat leakage. Larger sized valves with large seat and closure member surface areas, valves with harder elastomers, and valves with higher fluid velocities will require more force to fully close the valve closure member than smaller valves, valves with soft elastomers, and valves with lower fluid velocities.

Linear stem movement valves have hard stops at each end of travel that limit their movement. Rotary stem movement valves may or may not have hard stops at their movement points where they provide minimum and maximum flow. Rotary stem movement valves with hard stops usually have the hard stops aligned at their points of minimum and maximum flow. It is possible to limit a rotary stem valve's maximum flow by locating the stop before the point of maximum flow so that the hard stop restricts the actuator from moving above the desired flow point of travel.

Control valves are available in two-way and three-way configurations. Two-way valves consist of two ports for connection to a pipe with one port being the inlet port that receives the fluid from the pump supply piping system and the other port being the outlet port that sends the fluid out to the other side of the piping system. Three-way valves consist of three ports for connection to a piping system. Three-way mixing or converging valves have two inlets that receive the fluid usually one port directly from the pump supply piping system and the other port from another location in the system quite often a bypass fluid line and mix them together and send them out a common output port. Three-way diverting or diverging valves have one inlet that usually receives the fluid directly from the pump supply piping system and sends it to two different outputs usually a load and a bypass.

The closed end of movement for a two-way globe, gate, or butterfly valve is more critical than the open end because the valves require a high actuator torque from rotary actuators or force from linear actuators to assure that the valve closure member is always securely closed off to shut down the flow. The opposite full open flow position is not as important because the valve's flow is typically non-linear such that when the valve is close to full open it is usually already at or very close to full flow such that any flow gained by forcing the closure member more firmly against a hard stop is negligible. The repercussions of the piping system lacking a small amount of flow at the valve's fully open end is very minor compared to the same valve leaking the same small amount of fluid at the opposite closed end when it should be fully closed.

The closed end closure member position movements for three-way valves are more critical than for two-way valves because both ends of the three-way valve stem and closure member travel closes off one of the valve ports because the two inlet ports for a three-way mixing valve or the two outlet ports for a three-way diverting valve operate in opposite directions. The three-way valve may have one or two closure members. Three-way valves with one plug, or closure member, such as globe valves have a dual function plug with two seating surfaces and flow geometries. Three-way valves with two discs, or closure members, such as butterfly valves have two separate closure member each with their own flow geometry and seating surface. When one port is fully open the other port is fully closed and when the plug for a single plug three-way globe valve or discs for a two disc three-way butterfly valve are somewhere between the two ends the flow of each port is approximately the inverse of the other port.

On at least the closed end of two-way valves and on both ends of three-way valves it is important to not only tightly close the valve closure member to the seat, but the actuator must have the capability of moving the closure member slightly farther than the seat in case the valve elastomer becomes thinner from wear, erosion, aging, or compression and the valve stem requires additional movement to further move the closure member to shutoff fluid flow through the valve.

Valves have a static load and a dynamic load. The valve's static load includes frictions of the stem seals and their compressions along with the weights of the valve stem and closure member components relative to the valve's installed orientation along with any movement efficiency losses caused by flexing and bending of the valve linkage components. Different valve types of the same size may have different static load requirements based on their inherent designs. The valve's dynamic load is determined by the valve closure member's area relative to the amount of flow resistance that it is opposing. The valve actuator must have adequate force for linear stem movement globe and gate valves or torque for a rotary stem movement ball and butterfly valves to close off the valve closure member against a specified close off pressure rating level while maintaining the valve's specified seat leakage.

Valves with hard stops experience reaction or stall torque at each stop. Between the stops they have static and dynamic loads. The valve's static load is constant through its stem movement while its dynamic load varies as the valve stem travels from its minimum and maximum positions. With no fluid flowing in the system there is no dynamic load. When there is fluid flowing in the system the dynamic load is directly determined by the valve's inlet to outlet pressure differential which, in turn, is directly associated with the valve's flow volume.

Stiction is a static friction that can occur when two contacting surfaces adhere together creating cohesion. The force required to start the movement of the adjacent surfaces is much greater than the force required to keep the surfaces moving. Stiction is the initial force threshold required to overcome static cohesion rather than continuous force. The propensity of a valve to experience stiction is dependent upon the valve design including the area of the adjacent moving surfaces, the surface material and texture, and the clearance between the two surfaces. Other contributing factors include the frequency of movement of the two surfaces and the mineral and chemical composition of any fluids that come in contact with the surfaces.

The static and dynamic force load relationship of linear stem movement globe valves with unbalanced seat based solid suspended plugs without known stiction can be expressed mathematically as:

$$Af=Sf+Pw+(Pd\pi Psf)+(0.785398 PdDpPgf)$$

Figure 8:
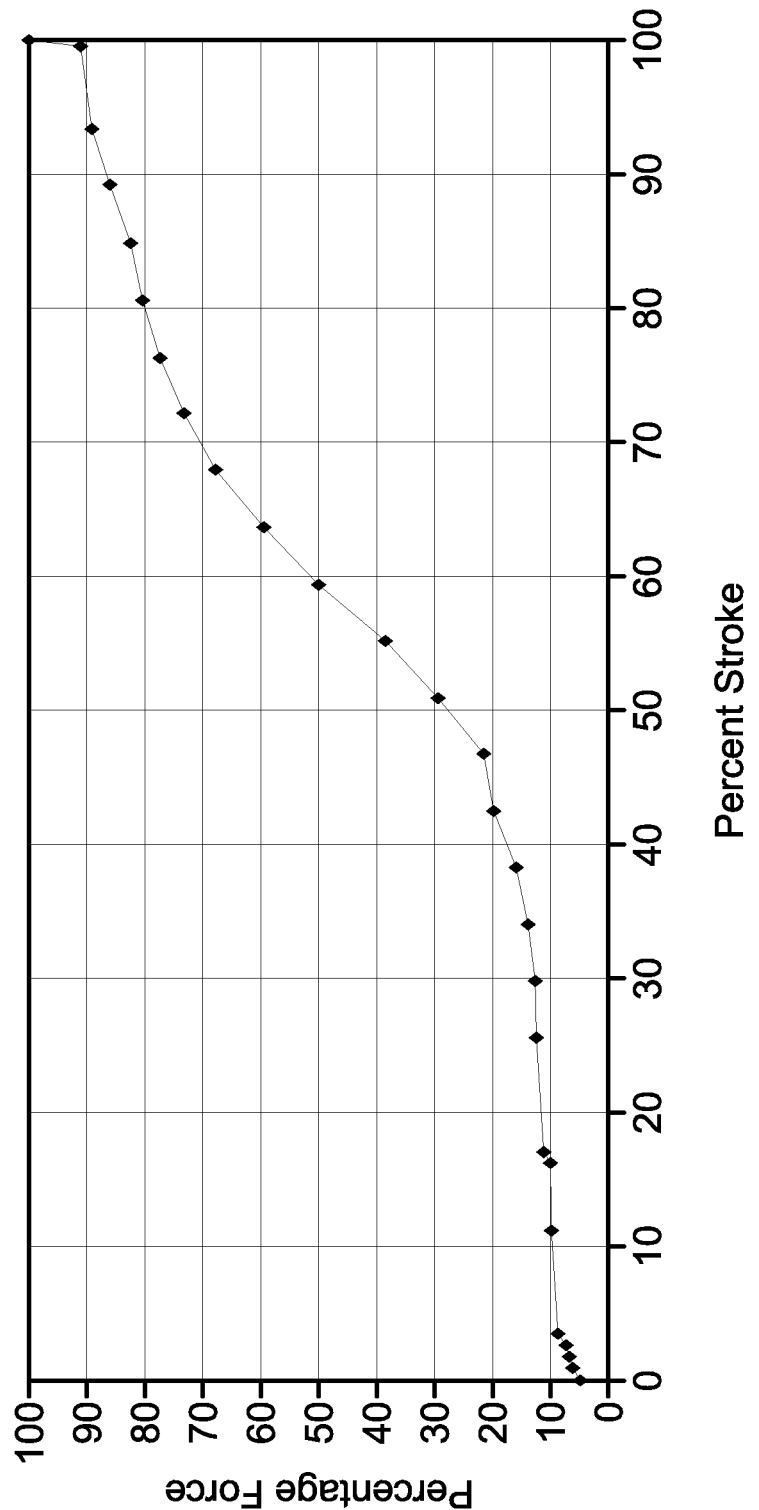
FIG. 8 is a graph showing the relationship between a linear movement valve stem movement and stem force.

Af=Actuator Force in pound-force (lbs.)
Sf=Stem Friction in pound-force (lbs.)
Pw=Valve Plug and Stem Weight in pounds (when mounted in a stem up position)
Pd=Valve Plug Seating Diameter in inches
Psf=Valve Plug Seat Sealing Factor in lb./inch of plug circumference in pound-force (lbs.)
Dp=Differential Pressure Across Valve (psi)
Pgf=Plug Geometry Factor An example of the relationships expressed in the above formula is shown in FIG. 8. The Sf Stem Friction and Pw Valve Plug and Stem Weight are static forces that are consistent through the valve stroke. The Sf Stem Friction is a result of the valve's stem seal which has a constant tension on the valve stem to maintain a tight consistent seal to prevent fluid leakage from the stem hole. The Pw Valve and Stem Weight is valid when the valve is mounted in its normal stem up orientation. An evaluation of stroking the valve statically without fluid flow and differential pressure can used to verify these static forces.

The (Pd$\pi$Psf) force factor occurs only when the plug is closing and compressing against the valve seat to achieve the valve's rated seat leakage and close off pressure. The Psf Valve Plug Seat Sealing Factor is an empirical value that varies with the valve's plug to seat seal material composition and the valve's rated seat leakage. Hard elastomers have a higher Psf force value than soft elastomers to obtain the necessary compression to achieve the rated seat leakage. Hard seated or metal to metal surfaces have even much higher Psf force values because a higher force is required to flatten the surfaces because no compression is present. Lower levels of seat leakage require significantly higher levels of compression of the valve's plug to seat seal material composition and, consequently, have much higher Psf force values.

The (0.785398PdDpPgf) force factor is a hydrodynamic force in the axial direction that increases when a valve plug closes off against water pressure. With linear movement seat based globe valves the Dp Differential Pressure Across Valve acts on the seat area for the entire strike. For unbalanced globe valves the valve plug axial force is typically the dominate force component. There may also be a transverse force acting perpendicular to the valve stem axis. This force varies with the valve design, and typically is a very small force component.

The Pgf Plug Geometry Factor provides a plug position correction factor to adjust for the plug's geometries including plug diameter ratio, inner body wall to plug clearance, and plug shape. The plug's diameter may be larger than the valve seat diameter. When the plug is closed the force is against the seat diameter's surface area only. As the valve plug is positioned above the seat the force will be against a larger surface area if the plug's diameter is greater than the seat diameter, and can consequently act to increase the plug's total surface force. As the plug moves further from the seat the clearance between the plug and the inner valve body wall will increase and will lower the differential pressure and the static pressure of the plug face. Different plug shapes with the same diameter will exhibit different forces as a result of differing flow deflections off their flow facing surfaces. The Pgf Plug Geometry Factor varies with the plug as shown in FIG. 9. The Pgf Plug Geometry Factor is utilized by means of a lookup table or polynomial based on the variables expression of the stem positions. The Pgf Plug Geometry Factor may vary and possibly be unique with different valve sizes and design types.

The static and dynamic torque load relationships of rotary stem movement butterfly valves with non-eccentric discs without known stiction can be expressed mathematically as:

$$At=Tsu+(0.785398Dd^2Dp(DsBff/2))+Ts+(Dd^3DpDgf)$$

Figure 10:
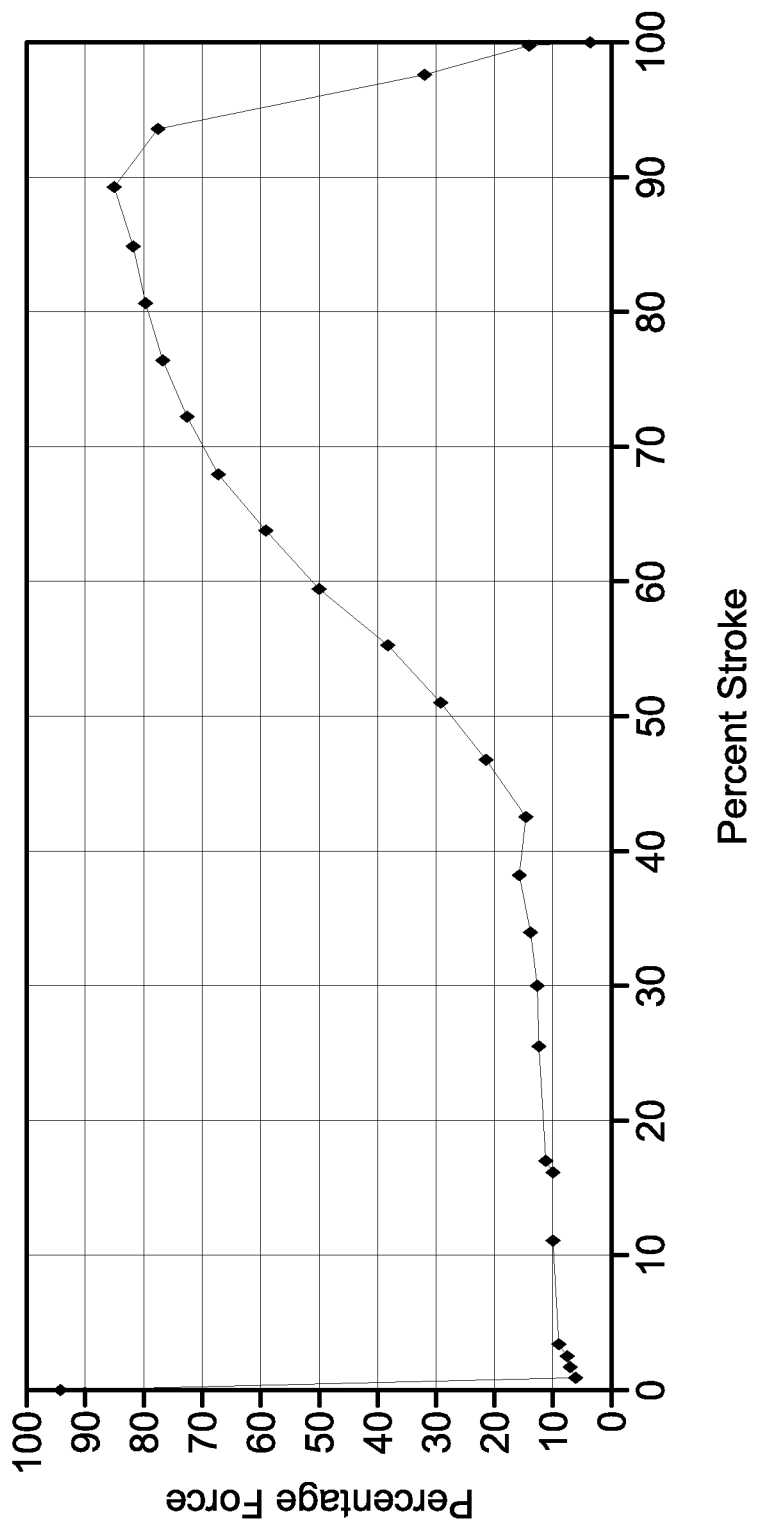
FIG. 10 is a graph showing the relationship between a rotary movement butterfly valve stem movement and stem torque.

At =Actuator Torque in pound-force (lbs.-in)
Tsu=Torque for Seating and Unseating
Dd=Valve Disc Diameter in inches
Dp=Differential Pressure Across Valve (psi)
Ds=Valve Stem Diameter in inches
Bff=Bearing Friction Factor
Ts=Torque Stem Friction
Dgf=Disc Geometry Factor An example of the relationships expressed in the above formula is shown in FIG. 10. The Tsu Torque for Seating and Unseating is a static force that occurs when the disc is seating and unseating with the disc perpendicular to the valve piping system. The Tsu Torque drops off sharply after the disc has opened, and is directly related to the circumference of the valve seat, the composition and contact area of the disc seat, and the valve's rated close off pressure rating as butterfly valves with higher close off ratings may have smaller clearances between the disc and valve seat creating a tighter fit, greater seat compression, and a consequential higher torque requirement.

The butterfly valve stem shaft has bearings to stabilize the stem as forces are exerted on it from flow forces against the disc. The Dd Valve Disc Diameter and Ds Valve Stem Diameter are based on the valve's size and along with the stem shaft friction expressed with the Bff Bearing Friction Factor correlate to the torque induced between the stem shaft and the actuator linkage as the stem is rotated. The (0.785398Dd$^2$Dp(DsBff/2)) dynamic torque factor is a result of the pressure forces against the disc that are transmitted to the valve stem.

The Ts Torque Stem Friction is a static force that is consistent through the valve stroke. The Ts Torque Stem Friction is a result of the valve's stem seal which has a constant tension on the valve stem to maintain a tight consistent seal to prevent fluid leakage from the stem hole. An evaluation of Tsu Torque for Seating and Unseating and the Ts Torque Stem Friction for stroking the valve statically without fluid flow and differential pressure can be used to verify these static torques.

The (Dp3DpDgf) torque factor is a dynamic torque that occurs when the valve disc is in its mid positions from off the valve seat to its full open position. With rotary movement non-eccentric butterfly valves the Dp Differential Pressure Across Valve acts on the disc area for the entire stroke with unbalanced distribution of forces on the upstream side of the disc. The velocity of the fluid passing by the trailing disc edge is greater than the leading edge creating a variance in velocity and subsequent greater forces on the upstream surface of the disc. The fluid forces act to increase the torsional force and drive the disc toward the closed position. The Dgf Disc Geometry Factor is analogous to the globe valve Pgf Plug Geometry Factor shown in FIG. 9 that is utilized by means of a lookup table or polynomial based on the variables expression of the stem positions. The Dgf Disc Geometry Factor may vary and possibly be unique with different valve sizes and design types.

The dynamic force relationship to the fluid flow or torque relationship to the fluid flow must have a high association before force or torque can be used to calculate fluid flow. The association can be linear as verified with a straight vector on a scatter diagram providing good correlation or can be a non-linear association. The association should be measured by an association test, such as the Spearman rank correlation coefficient, which can transform a non-linear relationship to a linear relationship by using the ranks of the data set rather than their actual values. The Spearman rank correlation coefficient provides a nonparametric measurement with no requirement for normality of how well an arbitrary monotonic function describes the relationship between two variables. A Spearman correlation of 1 results when the two variables being compared are increasing monotonically perfectly related even if their relationship is not linear.

The Spearman coefficient when there are no tied ranks can be expressed mathematically as:

$$RS = 1 - \frac{6 \sum Di^2}{n(n^2 - 1)}$$

Rs=Spearman's Coefficient of Rank Correlation
Di=Difference in the Ranks given to the Two Variable Values for each Item of Data
n=Number of Data Pairs The Rs strength can be described as 0.00 to 0.19 (0.00 to −0.19) very weak positive (negative) correlation, 0.20 to 0.39 (−0.20 to −0.39) weak positive (negative) correlation, 0.40 to 0.59 (−0.40 to −0.59) moderate positive (negative) correlation, 0.60 to 0.79 (−0.60 to −0.79) strong positive (negative) correlation, to 0.80 to 1.0 (−0.80 to −1.0) very strong positive (negative) correlation. A larger number of Data Pairs provide n−2 degrees of freedom that should be used for significance testing of the calculated Spearman's Coefficient of Rank Correlation. The significance test investigates whether or not a null hypothesis can be accepted or rejected. The null hypothesis tests the inference from the sample to the population that the sample represents.

Pressure-dependent control valves are selected primarily on pressure drop through the coil, valve flow coefficient factor, and close-off rating. The valve flow coefficient factor is the measurement of flow expressed by the term Cv which is defined as one US gallon (3.8 liters) of 60° F. (15.6° C.) water during one minute with a one psi (6.9 kPa) pressure drop. A valve's rated Cv is taken when it is fully open, and will be less and will vary when the valve plug is at other positions. At a particular valve plug position the flow rate of the pressure dependent valve changes based on the differential pressure across the valve (which varies with the pump curve and interaction of the other valves in the system). The Cv can be expressed mathematically as:

$$Cv = GPM \sqrt{\frac{SpecificGravity}{\Delta P}}$$

Cv=Coefficient of Flow
GPM=US gallons per Minute at 60° F., 15.6° C.
ΔP=Differential pressure in PSI
SpecificGravity=Specific Gravity of the Fluid Since the fluid's specific gravity varies with fluid temperature and concentration of water and anti-freeze an alternate mathematical method of determining the Cv and GPM can be expressed by:

$$Cv = \frac{GPM}{(SGCF \sqrt{\Delta P})}$$

$$GPM = Cv(SGCF \sqrt{\Delta P})$$

SGCF=Specific Gravity Correction Factor
With water being the fluid media with a specific gravity of one the Cv and GPM can be expressed mathematically as:

$$Cv = \frac{GPM}{\sqrt{\Delta P}}$$

$$GPM = Cv \sqrt{\Delta P}$$

The mathematical relationship can be restated with water as the fluid media for differential pressure as:

$$\Delta P = \left(\frac{GPM}{Cv}\right)^2$$

The specific gravity of a liquid is the ratio of the density of the liquid compared to the density of pure water at 39° F., (4° C.). Specific gravity is a ratio which has no units. A liquid with a specific gravity less than one will float in water because its density is less than the density of water. Conversely a liquid with a specific gravity greater than one will sink in water because its density is greater than the density of water. Ethylene and propylene glycol water mixtures have specific gravities of greater than one and therefore have a density greater than water.

When the water flows through a valve, it accelerates in the valve's restricted flow path which results in a decrease in pressure. The water reaches its highest velocity at a point called vena contracta. The fluid is at its lowest pressure and highest velocity at the vena contracta. As the water exits the valve some of the pressure loss is recovered as the liquid decelerates. As a consequence, the pressure in the valve may be lower than the downstream pressure. If the pressure in the valve drops below the vapor pressure of the water, it will start to vaporize. This condition, known as cavitation, will result in a lower flow rate than calculated in the Cv formula above because when cavitation water bubbles form in the vena contracta, the vapor bubbles will increasingly restrict the flow of water until the flow is choked with vapor. This condition is known as choked or critical flow. When the flow is fully choked, the flow rate does not increase when the pressure drop is decreased.

When cavitation occurs, the water in the valve rapidly converts to a vapor and then experiences a pressure recovery to some pressure above the vaporizing pressure causing an implosion or collapse of the vapor bubbles. This can result in mechanical corrosion or pitting damage to the valve components immersed in the water, breakage of the valve components due to extreme vibration, and detectable noise in the valve. The valve components most at risk for cavitation damage are valve plugs and seats that have parallel running surfaces. The mechanical pitting and corrosion will vary with various valve material compositions. Cavitation occurs when the vapor pressure is more than the vena contracta pressure, but less than the outlet pressure. When the vapor pressure is less than the vena contracta pressure, there is full water flow with no cavitation.

Figure 11:
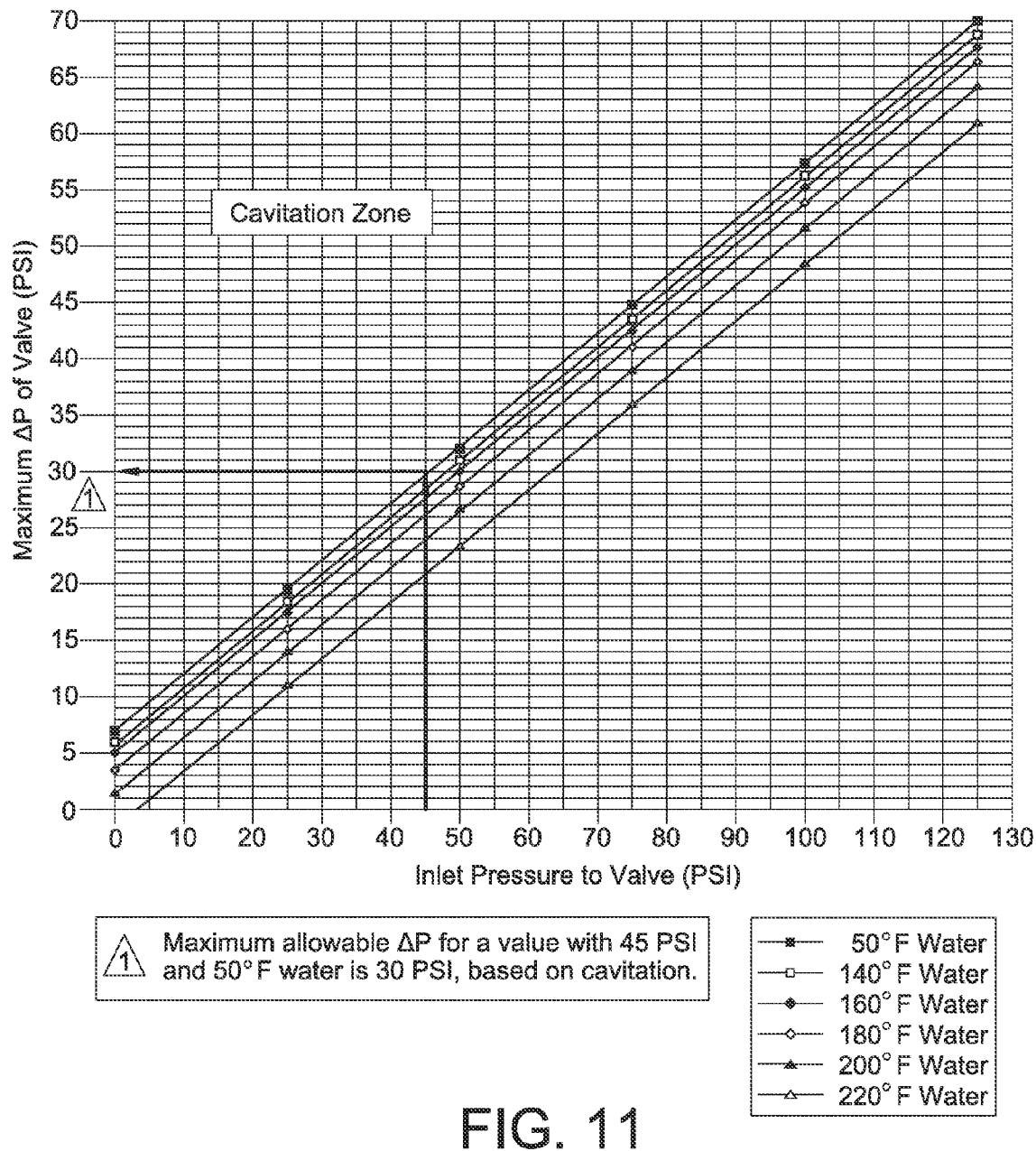
FIG. 11 is a graphical illustration of a cavitation zone water temperature relationship, in accordance with an embodiment of the invention.

The maximum allowable pressure differential across a valve that is possible without a cavitation condition depends upon the temperature of the water, because the vapor pressure of the water varies with the water temperature. When water is in a confined closed container, an equilibrium exists between the water and its gaseous state. The vapor pressure does not depend on the amount of water. The boiling point is the temperature where the vapor pressure reaches the atmospheric pressure, which varies with the altitude. Since the vapor pressure of water increases with water temperature, with warmer water the cavitation condition occurs at lower differential pressures than with cool water, as shown in FIG. 11. For example, the maximum allowable differential pressure without cavitation for a valve with a 45 psi (310 kPa) inlet pressure and 50° F. (10° C.) water temperature is 31 psi (214 kPa). With the same 45 psi (310 kPa) inlet pressure and with a 220° F. (104° C.) water temperature the maximum allowable differential pressure without cavitation drops to 21 psi (145 kPa).

Vapor pressures vary with the type of liquid. Although different liquids have vapor pressures that all generally increase as the temperature increases, and which decrease as the temperature decreases, the rate of change, as well as the boiling point, varies with each liquid. Glycols have lower vapor pressures than water and their boiling points are above the boiling point of water. At 68° F. (20° C.), the vapor pressure of water is more than 100 times as great as that of propylene glycol. The vapor pressure of systems containing a mixture of ethylene glycol or propylene glycol and water will be different than the vapor pressure of systems with just water. Further, the vapor pressures will vary with the concentration volume of ethylene glycol or propylene glycol relative to the water in the system. Water systems using a glycol water mixture rather than just water will have different cavitation points as a result of their different vapor pressures.

Pressure-independent valves are generally selected based on the maximum design flow rate of the coils they are being used to control. Pressure-independent valves provide a constant flow volume with a particular control input signal irrespective of the differential pressure. Typically, this is accomplished either by use of an internal differential pressure controller or by measuring the flow volume and automatically adjusting the valve plug to maintain a constant flow volume. Pressure-independent valves provide this constant flow volume over a defined differential pressure range. They also have a maximum flow rate that limits the flow if the valve's control signal commands it to its full open position.

In particular embodiments, pressure-independent valves increase energy efficiency by allowing the pump's variable frequency drive (VFD) to run at its lowest possible speed to satisfy the demand of the system. These valves may also minimize interaction with other valves, and lower installation costs because manual flow balancing is simplified and commissioning time significantly reduced. Further, pressure-independent valves may increase the efficiency of the chiller/boiler system by maintaining a more constant temperature drop across the coils. Pressure-independent valves can also act as automatic balancing valves by providing a constant control input signal to the control valve, or by providing the maximum control input signal when the valve's maximum rated flow matches the required balancing flow rate.

In a particular embodiment of the invention, the valve and actuator assembly 36 includes valve 18, valve actuator 14, room temperature controller 8, fluid temperature sensor 22, flow rate sensor 19, inlet and outlet pressure sensors 20, 21, valve plug position sensor 23, and freeze detection controller 27 in one integral assembly. In more particular embodiments, the valve and actuator assembly 36 can be configured by the user for either pressure-dependent (PD) or pressure-independent (PI) valve control. In certain embodiments of the invention, the valve and actuator assembly 36 is configured to provide pressure-dependent or pressure-independent control using a separately connected temperature controller rather than an internal temperature controller.

In a particular embodiment, field selection between pressure-dependent and pressure-independent via jumper switch, for example, by selecting the desired mode on PI-PD mode jumper 16, shown in FIG. 5A. In some embodiments, the valve and actuator assembly 36 receives signals from the room temperature sensor and setpoint 1, and determines whether there is a requirement to open or close the linear plug movement valve 18, based on the difference between the room temperature sensor and room setpoint. The linear plug movement valve 18 is mechanically positioned by the linear valve stem movement actuator 14, which receives its signal from PI-PD mode selection device 15. The linear plug movement valve 18 has a plug that is movable along the longitudinal flow axis of the valve port positioned between its inlet passageway and outlet passageway. The linear plug movement valve 18 includes a stationary sealing port, or valve seat, and a generally cylindrically-shaped outer plug that travels in a linear plane from the stationary sealing port upward toward its maximum open position, which is limited by the opposite linear plug movement valve 18 outer wall for pressure-dependent operation, or by the valve and actuator assembly 36 electronically controlled position for pressure-independent operation.

In other embodiments the linear plug movement valve is replaced with a rotary movement valve closure member valve. The linear stem movement actuator 14 and linear plug movement valve 18 can be replaced by a rotary stem movement actuator 14 and rotary valve closure member valve 18 such as a butterfly or ball valve. The rotary valve closure member valve 18 is mechanically positioned by the rotary stem movement actuator 14, which receives its position signal from the PI-PD mode selection device 15. The rotary valve closure member valve 18 has a disc or spherical ball that is movable with angular rotation within the valve port positioned between its inlet and outlet passageways. The rotary plug movement valve 18 includes a stationary sealing port, a valve seat, and a flat disc, contoured disc, or spherical closure member that travels from full closed to full open over 90 degrees of angular rotation.

The linear valve stem movement actuator 14, or alternatively rotary stem movement actuator 14, can be set for sensitive or less sensitive control with a deadband setting to prevent overshoot in water systems that are oversized relative to the controlled area. The PI-PD mode selection device 15 utilizes either a pressure-dependent or pressure-independent control algorithm depending upon the position of the PI-PD mode jumper 16. When the valve and actuator assembly 36 is setup for a pressure-dependent valve operation from the PI-PD mode jumper 16, the PI-PD mode selection device 15 receives its signal from the pressure-dependent mode water valve position controller 11.

Figure 12:
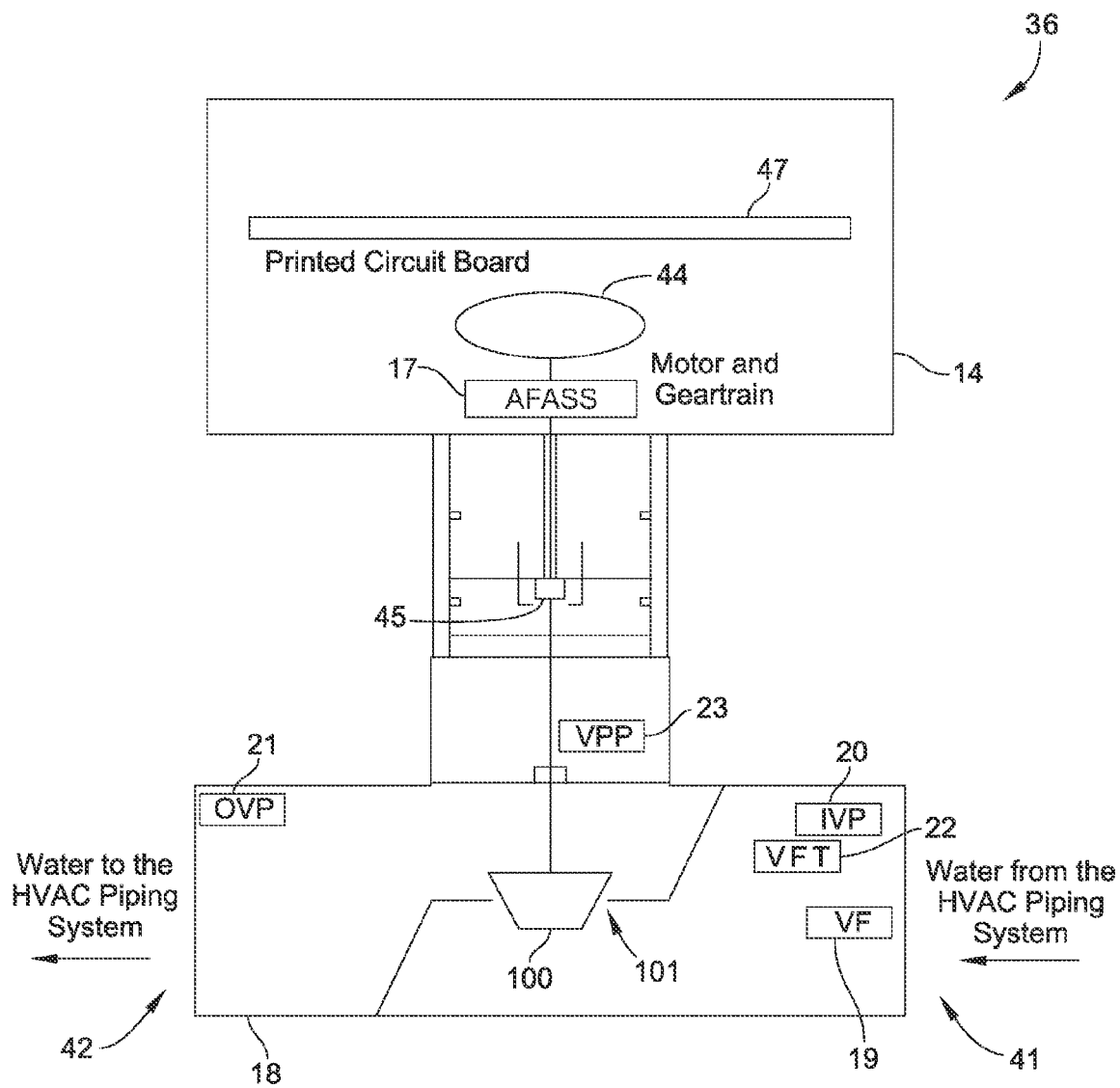
FIG. 12 is a physical diagram of the new art design contained in an integrated package.

FIG. 12 is a schematic diagram of the valve and actuator assembly 36, in accordance with an embodiment of the invention. The valve and actuator assembly 36 includes the valve 18 with valve plug 100, which seats in valve seat 101. The valve 18 further includes an optional flow rate sensor 19, an inlet 41, which receives fluid or a fluid mixture from the HVAC piping system, with inlet pressure sensor 20, and an outlet 42, which supplies fluid or a fluid mixture to the HVAC piping system, with outlet pressure sensor 21. The valve 18 also has a fluid temperature sensor 22 and a plug position sensor 23.

The valve plug 100 position is controlled by the valve actuator 14, which positions the valve plug 100 using a motor and geartrain 44 coupled to the valve plug 100 via a linkage assembly 45. The valve actuator 14 further includes a circuit board 47, which in particular embodiments, contains circuitry for the various controllers, control modules, and network communications modules described herein and shown schematically in FIGS. 5A and 5B. In a particular embodiment, the actuator force and stroke status sensor 17 senses the linear plug movement valve 18 force. In other embodiments, the actuator force and stroke status sensor 17 can be replaced by an actuator torque and rotation status sensor that senses the torque for a rotary valve closure member valve, such as a butterfly or ball valve.

Figure 13:
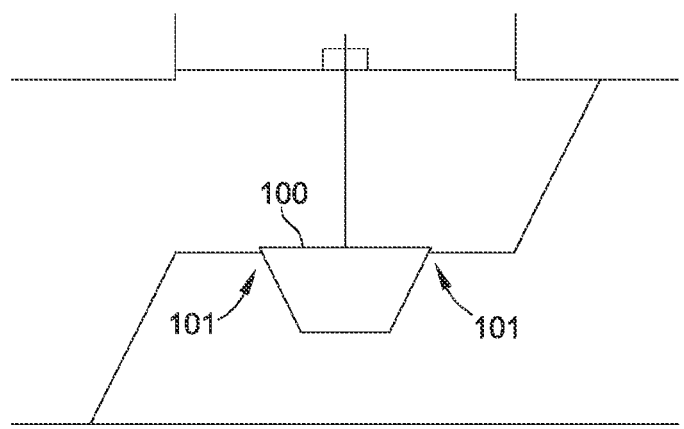
FIG. 13 is a schematic diagram showing the valve plug closed, in accordance with an embodiment of the invention.
Figure 14:
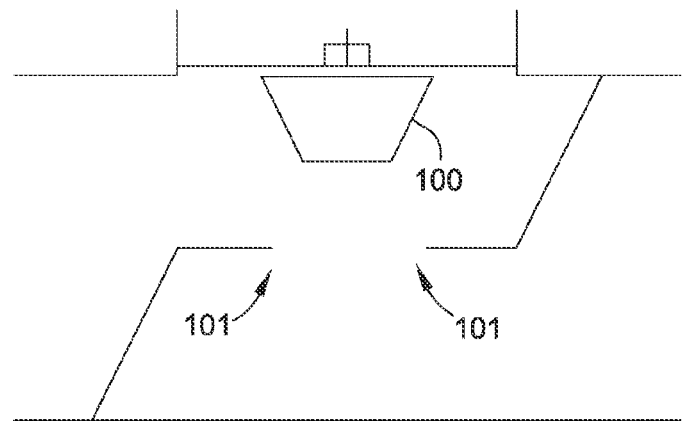
FIG. 14 is a schematic diagram of the valve plug open for pressure dependent control, in accordance with an embodiment of the invention.
Figure 15:
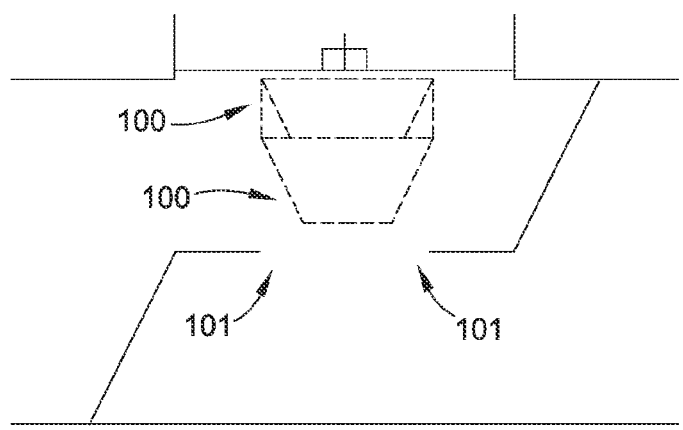
FIG. 15 is a schematic diagram of the valve plug open for pressure independent control, in accordance with an embodiment of the invention.

FIGS. 13-15 are schematic representations showing various modes of operation for the valve plug 100. Specifically, FIG. 13 shows the minimum-flow or closed position of the linear plug movement valve's plug 100. This shows the position of the valve plug 100 when fully closed against the valve seat 101. In this position, there is no flow except possibly a very small amount of leakage through a possible small gap between the valve plug 100 and the seat 101. The minimum-flow or closed position of the valve plug 100 for the linear plug movement valve is relevant for both pressure-dependent and pressure-independent valve operation.

When the PI-PD mode jumper 16 is setup for pressure-dependent valve operation, the maximum-flow position of the valve plug 100 is fully open as shown in FIG. 14, such that the flow volume will vary with the differential pressure across the valve. When the PI-PD mode jumper 16 is setup for pressure-independent operation, the maximum-flow position of the valve plug 100 will vary, as shown in FIG. 15, and is controlled by the pressure-independent mode water valve position controller 13, based on the remote maximum flow signal 4, regardless of the temperature difference between the room temperature sensor and setpoint as received from the room temperature sensor and setpoint module 1. Maximum flow is maintained in the pressure-independent mode because the flow rate needs to be limited to allow adequate time for the fluid or fluid glycol mixture to be in the coil to provide proper heat transfer.

Although aspects of the invention have been described with respect to some preferred embodiments, those skilled in the art will recognize that changes may be made in form and detail without departing from the scope and spirit of the invention. For example, HVAC control valves can have linear motion plug travel, such as with a globe valve or gate valve, or can have angular rotation plug travel, such as with a ball valve, butterfly valve, or shoe valve. Embodiments of the invention may include, but is not limited to, any of the aforementioned valve types, including the linear plug movement valve 18.

In the embodiment of FIGS. 5A and 5B, the valve and actuator assembly 36 includes an optional valve flow rate sensor 19, an inlet valve pressure sensor 20, an outlet valve pressure sensor 21, a valve plug position sensor 23, an anti-cavitation control module 26, and an energy consumption calculation and retention module 24. The valve and actuator assembly 36 is suitable for use with a variety of flow rate sensors 19 and a variety of pressure sensing technologies. These include, but are not limited to: 1) differential pressure; 2) positive displacement; 3) velocity; and 4) mass flow.

The operation of differential pressure sensors is based on the premise that the pressure drop across the valve is proportional to the square of the flow rate. Typically, the flow rate is obtained by measuring the pressure differential and extracting the square root. This requires a primary element to cause a kinetic energy change (e.g., constriction in the line to create a difference in upstream and downstream pressures), and a secondary element to measure the differential pressure. Available differential pressure sensors include, for example, orifice plate sensors, venturi tube sensors, flow tube sensors, flow nozzle sensors, pitot tube sensors, elbow tap sensors, target, variable-area sensors (rotameter), annubar sensors, and v-cone sensors.

Positive displacement sensors divide the liquid into specific discrete increments and move it on. The total flow is an accumulation of the measured increments and is usually a series of counts that are tallied over a period of time and stored into a register. Available positive displacement sensors include reciprocating piston, oval gear, nutating disk, rotary vane, and helix.

Velocity sensors operate linearly with respect to the volume flow rate, and are available using several different technologies including turbine sensors, vortex shedding sensors, swirl sensors, conada effect & momentum sensors, exchange sensors, electromagnetic sensors, ultrasonic sensors, Doppler sensors, and transit-time sensors.

Mass sensors measure the mass rate of the flow directly as opposed to the volumetric flow with various designs available including calorimetric (thermal dispersion) sensors, coriolis sensors, and thermal sensors.

In certain embodiments of the invention, the valve and actuator assembly 36 is configured to operate in a stand-alone non-communicating mode with total localized control, while in alternate embodiments, the valve and actuator assembly 36 is configured to operate in a communicating network that allows information to be sent and received by the valve and actuator assembly 36 in order to synchronize its operation with the building management system (BMS) and with other HVAC equipment (e.g., heating, cooling, pumping systems) in the building to provide diagnostic and energy data for remote monitoring, alarming, and data retention.

The remote communications control input signals 7 receive relevant valve and HVAC coil system data from the building management system (BMS) via a serial communication bus including the heat cool mode signal 3, remote maximum flow signal 4, and remote minimum flow signal 5. These signals allow the valve and actuator assembly 36 to be synchronized with the BMS and the building's mechanical heating, cooling, and pumping systems to increase energy efficiency of the building's HVAC system. These signals are retentively stored in the remote communications control input signals 7 such that the operation of the valve actuator assembly 36 can be adapted for the HVAC mechanical piping system in a stand-alone mode or in a communicating network mode. The retentively stored signals also allow for proper operation in a communicating network mode if for any reason communications to the BMS network are lost.

Figure 6:
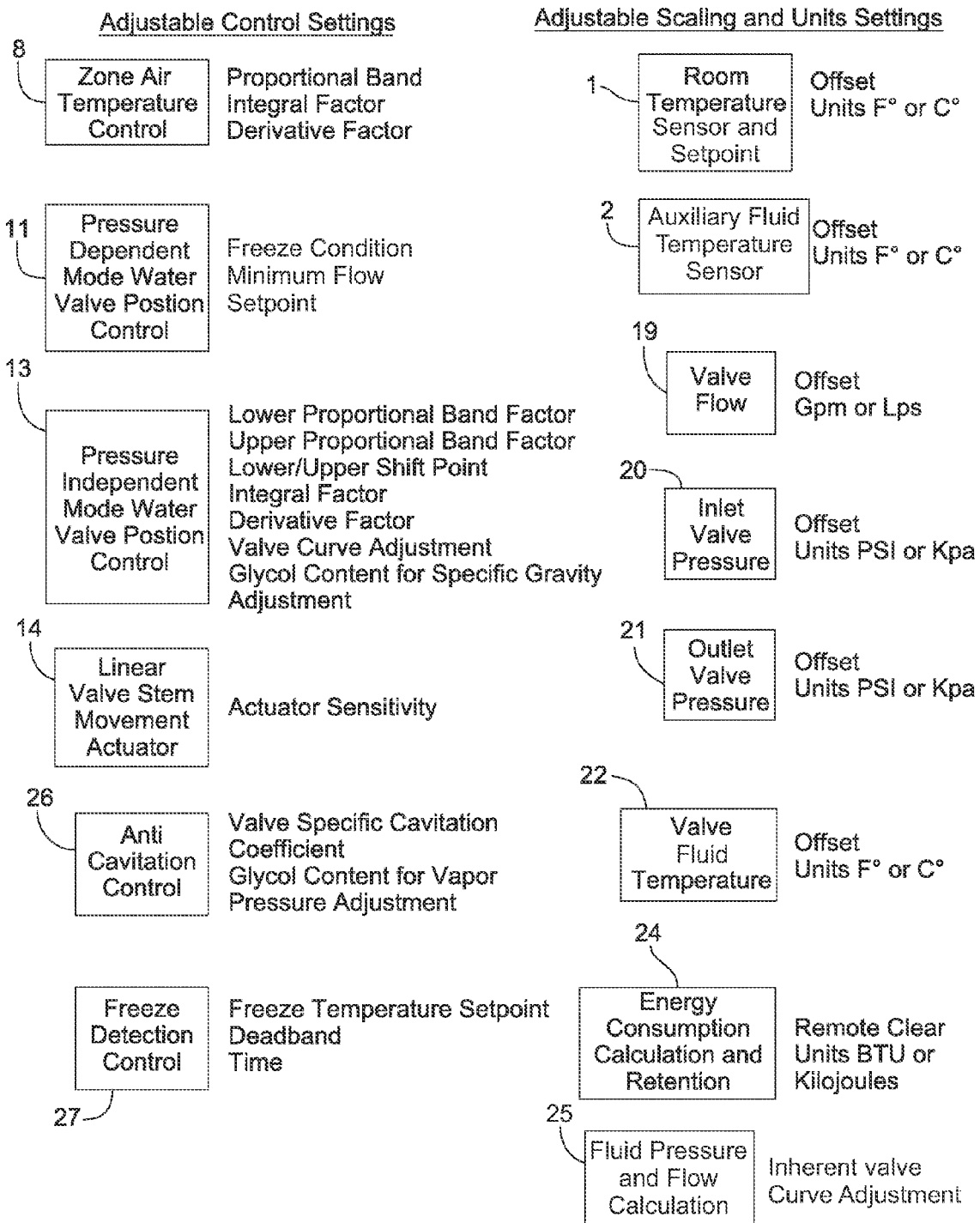
FIG. 6 is a block diagram illustrating adjustable setting for the integral valve and actuator assembly, according to an embodiment of the invention.

For stand-alone operation, the remote communications control input signal 7 values can be edited with a software programming tool that is initially used to establish the valve and actuator assembly 36 settings, but is not required to be left with the valve and actuator assembly 36. The software programming tool is also used to initially adjust operating parameters that are used for the valve and actuator assembly 36 basic operation, as shown in FIG. 6, for both the stand-alone and network communication modes. The adjustable operating parameters, shown in FIG. 6, have default settings that are preset to values that provide stable control for typical HVAC water systems, such that the valve and actuator assembly 36 will work reasonably well with all systems without adjustment. The optional adjustments will allow users to customize behavior of the valve and actuator assembly 36 to better work with the building management system if it is desired to further optimize the valve and actuator assembly 36 to match the unique HVAC conditions of the building.

Some of the adjustable operating parameters, shown in FIG. 6, are for the optional calibration of input sensors by means of changing an offset value, with a 'default setting of zero, to a positive or negative number to negate any error, if it is determined by an optional independent test measurement that an input sensor does not match another calibrated measurement. Other adjustable operating parameters, shown in FIG. 6, include selection of units for operation in different countries, and for the selection of different units for temperature, pressure, flow, and energy calculated values.

The pressure-dependent mode water valve position controller 11 receives inputs from the fluid pressure and flow calculation module 25 which provides the volume of fluid flowing through the valve, from the water coil minimum flow control module 10, which specifies the minimum water flow that is required during a potential freeze condition, from the zone air temperature controller 8 to provide an output control signal, and from the anti-cavitation control module 26, which indicates when inlet and outlet pressures are such that a cavitation condition can occur. The zone air temperature controller 8 compares the room temperature sensor and setpoint values received from the local hardwired control input signal 6, and determines if the valve 18 needs to proportionally open or close to maintain the desired room temperature. The pressure-dependent mode water valve position controller 11 uses a linear input signal to output command relationship that retains the inherent linear plug movement valve 18 water flow curve, unless an alternate curve adjustment has been optionally setup.

The fluid pressure and flow calculation module 25 calculates the fluid rate the most economical way using one of three methods or can use a traditional external flow meter. The most economical methods: method A 201, method B 221, method C1 241, and method C2 250, shown in FIG. 16, calculate the flow rate from internal information in the valve assembly. Method A calculation of flow rate from force 201 uses the valve's seat diameter, flow orifice components geometries, static friction forces, dynamic forces, seat and plug hardness, plug weight, and stem position to calculate the valve's flow rate. The stem friction force 202 and plug weight 203 comprise the static forces unique to each valve assembly 204. These forces are consistent through the valve stem stroke, and are separated from the dynamic forces received from the actuator and stroke status 17 by the calculate dynamic forces module 205.

The calculate Pgf plug geometry factor module 206 provides a flow correction factor based on the valve plug position 23 to adjust for the plug's geometries including plug diameter to seat diameter ratio, inner body clearance variance with stem position, and plug flow facing contour. This factor is calculated from a lookup table as shown in FIG. 9 or a polynomial based on the variables expression of the stem positions versus flow impact as determined by laboratory testing. The calculate valve plug seating force module 208 calculates the dynamic variable force that occurs when the plug compresses against the seat by using the lineal length of the plug to seat surface contact circumference, a lookup table that references the valve plug position 23 relative to when the plug contacts the seat, and the hardness of the seat and plug sealing surface materials.

The calculate current flow rate module 209 removes the dynamic force related to the valve compression against the valve seat from the total dynamic forces received from calculate valve plug seating force module 208. The resultant remaining force has a high association with the differential pressure across the valve. The differential pressure, in turn, has a direct relationship with and is calculated from the valve's Cv coefficient of flow and the consequential flow rate through the valve. The valve's Cv coefficient of flow can be derived from the valve stem position by means of a lookup table or polynomial based on the variables expression of the stem position relative to the fluid flow volume per minute through the valve with a one pound pressure drop with a fluid temperature of 60° F. (15.6° C.) as determined by laboratory testing.

Method A 201 is for a linear stem movement unbalanced seat based solid suspended plug globe valve. Although other designs of linear stem movement valves such as balanced plug and gate valves may have different flow orifice geometries and different mathematical force versus flow relationships one skilled in the art will recognize that the same concept can be used with alternate formulas to calculate the flow rate through the valve by means of the force and stem position signals available within the valve actuator assembly along with the known dimensions and flow geometries of the valve body.

Figure 16:
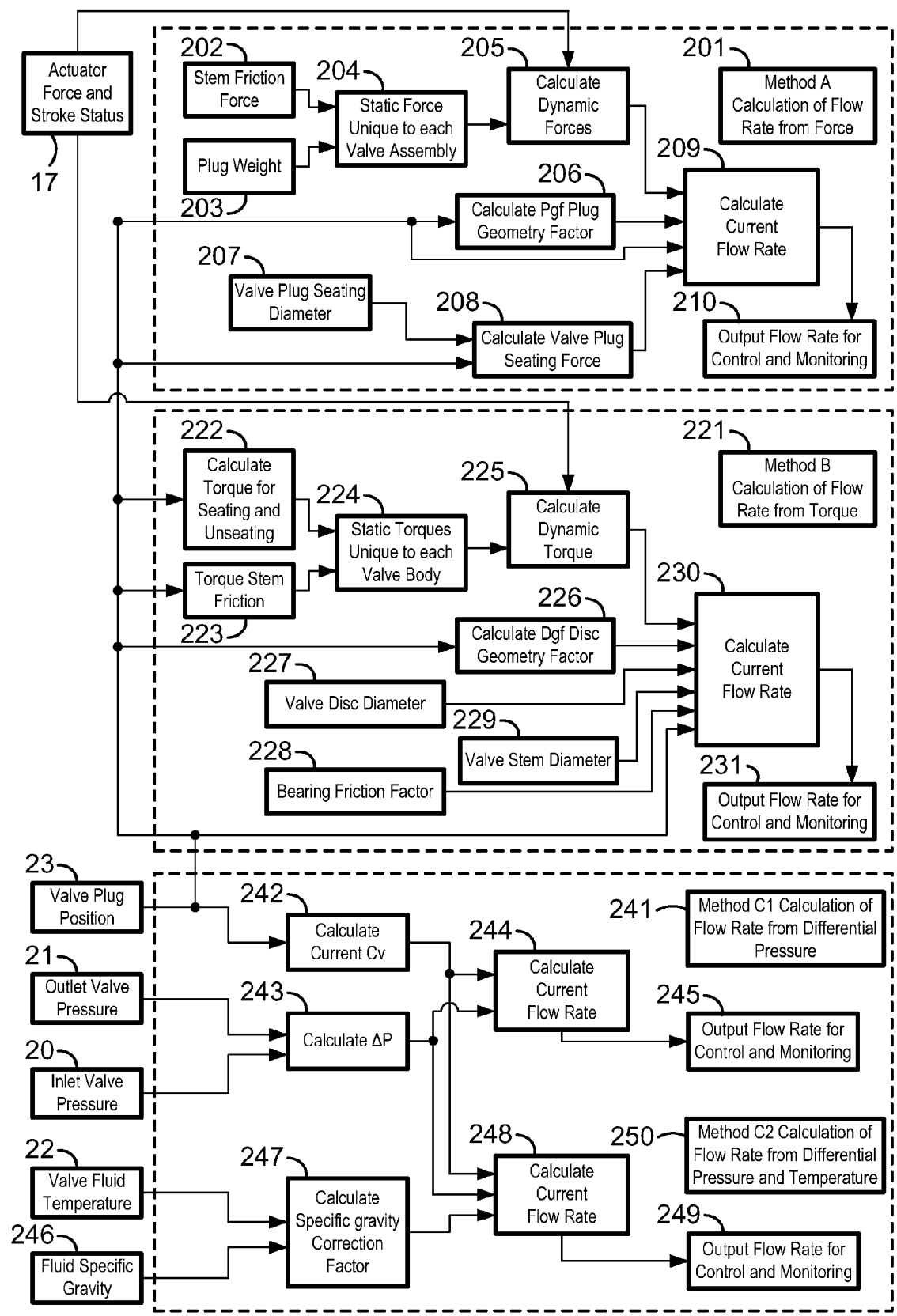
FIG. 16 is a schematic block diagram of the flow calculation.

Method B calculation of flow rate from torque module 221 shown in FIG. 16 uses the valve's disc and stem diameter, flow orifice components geometries, stem bearing friction factor, static friction torque, dynamic torques, and stem position to calculate the valve's flow rate. The torque stem friction sensor 223 is consistent through the valve stem stroke. The calculate torque for seating and unseating module 222 is variable through the stem stroke and occurs when the disc is seating and unseating and is positioned perpendicular to the pipe. The valve plug position sensor 23 converts its output from linear position percentage to an angular rotation percentage for rotary movement valves.

The calculate torque for seating and unseating module 222 references the valve plug position sensor 23 which senses the stem rotary disc angular position. The seating and unseating torque is calculated by a lookup table or a polynomial based on the variables expression of the rotary stem position relative to when the disc contacts the seat. The torque stem friction sensor 223 and calculate torque for seating and unseating module 222 comprise the static torques unique to each valve body 224. These torques are separated from the dynamic torques from the actuator force (torque) and stroke status sensor 17 by the calculate dynamic torques module 225. The actuator force (torque) and stroke status sensor 17 converts its output from force to torque for rotary operated valves.

The calculate Dgf disc geometry factor module 226 provides a flow correction factor based on the valve's plug (disc) position 23 to adjust for the valve's unbalanced distribution of forces on the upstream side of the disc. This factor is calculated from a lookup table as shown in FIG. 9 or a polynomial based on the variables expression of the stem position relative to the flow forces. The valve disc diameter 227 is used by the calculate current flow rate module 230 to calculate the surface area of the valve disc that is opposing the fluid flow creating a pressure drop across the disc and therefore increasing the stem friction torque.

The valve stem diameter 229, bearing friction factor 228, and valve disc diameter 227 provide inputs to the calculate current flow rate module 230 to determine what dynamic torque is required to overcome the variable stem friction and position the disc with a given inlet to outlet differential pressure. The calculate current flow rate module 230 calculated dynamic torque has a high association with the differential pressure across the valve. The differential pressure, in turn, has a direct relationship with and is calculated from the valve's Cv coefficient of flow and the consequential flow rate through the valve. The valve's Cv coefficient of flow can be derived from the valve stem position by means of a lookup table or polynomial based on the variables expression of the stem position relative to the fluid flow volume per minute through the valve with a one pound pressure drop with a fluid temperature of 60° F. (15.6° C.) as determined by laboratory testing.

Method B 221 is for a rotary stem movement butterfly valve with non-eccentric disc. Although other designs of rotary stem movement valves such as eccentric disc butterfly and spherical valve closing member ball valves may have different flow orifice geometries and different mathematical force versus flow relationships one skilled in the art will recognize that the same concept can be used with alternate formulas to calculate the flow rate through the valve by means of the force and stem position signals available within the valve actuator assembly along with the known dimensions and flow geometries of the valve body.

Although aspects of the invention have been described with respect to some preferred embodiments, those skilled in the art will recognize that alterations may be made in general architecture without departing from the scope and spirit of the invention. For example, the actuator force and stroke status sensor 17 can be adapted to measure force or torque, can be alternatively positioned within the actuator's geartrain to more precisely sense force or torque, or can consist of multiple sensors to isolate the force or torque to obtain a better association with the dynamic fluid pressure and consequential fluid flow.

Method C1 calculation of flow rate from differential pressure 241 shown in FIG. 16 uses the difference between the inlet valve pressure sensor 20 and outlet valve pressure sensor 21, flow orifice components geometries that dictate the valve's Cv coefficient of flow, and stem position to calculate the valve's flow rate. As the fluid flows through the valve seat with the valve closure member restricting flow energy is lost in turbulence which causes a consequential loss in fluid pressure. Thus, decreasing a fluid flow stream will create a greater upstream or inlet pressure than downstream or outlet pressure with similar inlet and outlet port pipe diameters and piping system lengths. The calculate ΔP module 243 calculates the differential pressure from the inlet valve pressure sensor 20 and outlet valve pressure sensor 21. In other embodiments, the inlet valve pressure and outlet valve pressure sensors 20, 21 are replaced by a single differential pressure sensor sensing and providing the difference between the upstream and downstream pressures.

The valve flow coefficient factor, Cv, is a quantitative rating of its ability to pass a fluid flow for a set of given pressure, temperature, and fluid density conditions while the valve closure member is at a particular stationary position. The calculate current Cv module 242 calculates the valve closure member's current Cv with water as the media from the valve plug position 23 by means of a lookup table or polynomial based on the variables expression of the stem position relative to the fluid flow volume per minute through the valve with a one pound pressure drop with a fluid temperature of 60° F. (15.6° C.) as determined by laboratory testing.

When the valve fluid is water, which has a specific gravity of one, the calculate current flow rate module 244 utilizes the valve's current Cv, as received from the calculate current Cv module 242, and the differential pressure, as received from the calculate ΔP module 243. In other embodiments, the calculate ΔP module 243 is replaced by a single differential pressure sensor providing the difference between the upstream and downstream pressures. Method C1 241 is for linear stem movement or rotary stem movement valves with water as the media.

Method C2 calculation of flow rate from differential pressure and temperature 250, shown in FIG. 16, uses the difference between the values sensed by the inlet valve pressure sensor 20 and the outlet valve pressure sensor 21 (see FIG. 6), flow orifice components geometries that dictate the valve's Cv coefficient of flow, a specific gravity correction factor, and stem position to calculate the valve's flow rate. As the fluid flows through the valve seat with the valve closure member restricting flow, energy is lost in turbulence which causes a consequential loss in fluid pressure. Thus, decreasing a fluid flow stream will create a greater upstream or inlet pressure than downstream or outlet pressure with similar inlet and outlet port pipe diameters and piping system lengths. The calculate ΔP module 243 calculates the differential pressure from the inlet valve pressure sensor 20 and outlet valve pressure sensor 21. In other embodiments, the inlet valve pressure sensor 20 and outlet valve pressure sensor 21 are replaced by a single differential pressure sensor which senses and provides the difference between the upstream and downstream pressures.

The valve flow coefficient factor Cv is a quantitative rating of its ability to pass a fluid flow for a set of given pressure, temperature, and fluid density conditions while the valve closure member is at a particular stationary position. The calculate current Cv module 242 calculates the valve closure member's current Cv, with water as the media, from the valve plug position sensor 23 by means of a lookup table or polynomial, based on the variables expression of the stem position relative to the fluid flow volume per minute through the valve, with a one pound pressure drop with a fluid temperature of 60° F. (15.6° C.) and a specific gravity of one as determined by laboratory testing.

Specific gravity is a unitless expression of the heaviness of a liquid compared to an equal volume of pure water at 39° F. (4° C.). Heavier liquids with a specific gravity greater than one will sink in water and lighter liquids with a specific gravity lower than one will float in water. Ethylene and propylene glycol water mixtures have specific gravities of greater than one and thus have a density greater than water. Different glycol types have different specific gravities. Ethylene glycol has a higher specific gravity than propylene glycol and a higher concentration of glycol mixed with water creates a higher specific gravity. Pressure has a negligible effect on a fluid's specific gravity making temperature the only variable required to be considered in the basis of the specific gravity.

The specific gravity of glycol varies with temperature with lower temperatures providing higher specific gravity values. Fluids with specific gravity values of higher than one provide greater flow than water at the same liquid temperature. The calculate specific gravity correction factor module 247 references the valve fluid temperature sensor 22 and fluid specific gravity 246 by means of a series of lookup tables or polynomials based on the variables expression of the glycol type and concentration and the fluid temperature. Greater concentrations of glycol have higher specific gravities at all fluid temperatures between the fluid's boiling and freezing points.

The calculate current flow rate module 248 utilizes the valve's current Cv for a fluid with a specific gravity of one as received from the calculate current Cv module 242. This calculated current Cv with a specific gravity of one is used with the differential pressure as received from the calculate ΔP module 243 to calculate the current flow rate of a fluid with a specific gravity of one. In other embodiments the calculate ΔP module 243 is replaced by a single differential pressure sensor providing the difference between the upstream and downstream pressures.

The calculate specific gravity correction factor module 247 references the valve fluid temperature sensor 22 and fluid gravity 246 by means of lookup tables or polynomials based on the variables expression of the glycol concentration and the fluid temperature. The calculate current flow rate module 248 converts its calculated flow rate of a fluid with a specific gravity of one to the flow rate of the piping system's utilized fluid with another specific gravity by means of the specific gravity correction factor received from the calculate specific gravity correction module 247. Method C2 250 is for linear stem movement or rotary stem movement valves controlling a miscible fluid combination having a specific gravity other than one as the media.

For an actual valve product application, it is anticipated that only one method would be utilized at a given time depending upon the type of valve controlled, the application's necessary flow accuracy, and the economic cost requirements for the project.

The proper direction of opening and closing the valve is determined by the heat cool mode signal 3. The proper direction of opening and closing the valve 18 will vary depending if the valve water source is providing hot water which will require that the valve 18 open to warm up the room or cold water which will require that the valve 18 close to warm up the room. The heat cool mode signal 3 has a local non-volatile mode selection, which can be fixed to define the direction of opening or closing the valve 18 if it is always operated with hot or cold water, or it can be overridden by the BMS from a remote location, by means of a serial communications bus, if the water temperature changes from hot to cold.

The zone air temperature controller 8 mathematically calculates the difference between the room temperature sensor and setpoint values received from the local hardwired control input signals module 6, and then provides an empirical position for the linear valve stem movement actuator 14 using its adjustable proportional band setting. The empirical position for the linear valve stem movement actuator 14 uses the valve plug position sensor 23 and room temperature sensor values to verify that the valve plug is being properly positioned to maintain the setpoint value as received from the room temperature sensor and setpoint module 1. The valve plug position sensor 23 feedback value is used to verify that the valve plug position is in its commanded position regardless of the internal valve pressures, which will change as the pump curve dynamically shifts along with the position of other valves in the piping system that affect the piping system's pressures.

The room temperature sensor feedback value is used to verify that the calculated linear plug movement valve 18 position will provide the correct amount of heat transfer so that the room temperature sensor will be at the same or very close to the room setpoint value as received from the room temperature sensor and setpoint module 1. Because the room heat loss and gain will not always be the same as the heat provided from the HVAC water coil heat transfer, via the linear plug movement valve 18, a varying temperature droop or offset difference will result at times between the room temperature sensor and the room setpoint device values. The temperature droop between the room temperature sensor and room setpoint device can be greatly minimized by the adjustable zone air temperature controller 8 integral setting, which provides a negative or positive adjustment value that is additive to the commanded position of the linear valve stem movement actuator 14. This will further drive the linear plug movement valve 18 to provide more or less heat to eliminate the difference between the room temperature sensor and the room setpoint values. Also available in the zone air temperature controller 8 is an optional derivative setting to anticipate fast changes to the room temperature to improve the HVAC system response, for example, when there are large load changes on the system.

In a particular embodiment, the pressure-dependent-mode water valve position controller 11 uses the zone air temperature controller 8 as its primary input, and then makes a comparison of its fluid pressure and flow calculation module 25 input and its water coil minimum flow control module 10 input to determine if the water and flow conditions are such that the calculated outputs of the zone air temperature controller 8 need to be overridden to a higher flow level to avoid a freeze condition of the HVAC water coil 64 (shown in FIG. 1) and associated piping system. The actual valve water temperature sensed by fluid temperature sensor 22 is used for freeze determination to avoid the issues that can result from assuming that the nearby air temperatures are the same as the water temperature. For example, an error such as this may cause the system to waste energy by forcing the water flow through the valve 18 to a full-flow condition when it is not required. It could also result in the system failing to sense a freezing water condition due to improper freeze stat mounting or due to air stratification.

The valve water temperature sensor 22 may be made from a resistive temperature device (RTD) that is located in the external wall of the linear plug movement valve 18 along with a thermally conductive grease to provide good heat transfer. The resistance of the RTD is measured by connecting it in series with a known reference resistor and applying a current to both resistances. The voltages across the resistances are then measured, and then digitized to represent the water temperature.

When a potential freeze condition is detected by the valve fluid temperature sensor 22, the water coil minimum flow control module 10 and pressure-dependent-mode water valve position controller 11 will override the zone air temperature controller 8 to provide the minimum amount of flow that is required to avoid a freeze condition as established by the remote minimum flow signal 5. In an example of system operation, the minimum flow continues until the water temperature rises at least 10° F. (5.6° C.) above the freeze temperature setpoint for 5 minutes or longer with the temperature differential, time period, and freeze temperature setpoint settings being field-adjustable by means of the freeze detection control module 27. In another example, the freeze protection is of the automatic reset type, and will revert back to zone air temperature control 8 after the temperature differential and time period requirements have been fulfilled.

Embodiments of the invention overcome a limitation of the traditional hard-wired automatic reset freeze stats of not alerting the building personnel that there may be a problem with the outdoor air ventilation controller, outdoor air ventilation actuator, or outdoor air ventilation damper, and also avoids a limitation of conventional hard-wired manual reset freeze stats in which normal control is disabled until the manual reset freeze stat is manually accessed and reset.

The anti-cavitation control module 26 uses the inlet valve pressure sensor 20, outlet valve pressure sensor 21, valve fluid temperature sensor 22, and the valve-specific cavitation coefficient to determine whether a cavitation condition exists, or to predict whether cavitation will occur. Since the water temperature affects the cavitation zone, which is also dependent on the valve's maximum allowable pressure differential, the anti-cavitation control module 26 uses the water temperature to calculate the fluid vapor pressure, which is used with the inlet valve pressure sensor 20, and with the outlet valve pressure sensor 21 to predict the point of incipient cavitation.

The valve-specific cavitation coefficient is unique to each valve, and is based on the ratio of the external inlet to external outlet pressure differential to the internal inlet to the minimum pressure in the valve pressure differential. Generally, the valve-specific cavitation coefficient is laboratory-confirmed by means of noise testing, as cavitation in a valve is usually a gradual process starting with only small portions of the valve plug experiencing vapor bubbles along with the consequential noise. The glycol content is used for a vapor pressure adjustment, as the vapor pressure varies with the water glycol mix as well as with the water temperature. Upon calculation of a possible cavitation condition by the anti-cavitation control module 26, the pressure-dependent-mode water valve position controller 11 overrides the zone air temperature controller 8 to reduce the valve's 18 differential pressure drop until it is out of the cavitation zone.

The maximum permissible pressure drop across the valve which is not to be exceeded to avoid cavitation is determined by the following calculations:

$$\Delta P = VSCC * (P1 - Pv)$$

$\Delta P$=Pressure drop of incipient cavitation
VSCC=Valve Specific Cavitation Coefficient
P1=Valve Inlet Pressure (psia)
Pv=Vapor pressure of Water Mixture at Flowing Water Temperature (psia)
Psia=psig+14.7
The Pv is calculated by the anti-cavitation control module 26 look up table referencing the water mix glycol content and the water mix temperature.

In certain embodiments, the valve plug position sensor 23 is used for remote indication and verification that the actual flow matches the commanded position. The hardwired position output signal 28 and the remote communications control output signal 29 receive signals from the valve plug position sensor 23 and fluid pressure and flow calculation module 25, and provide the true valve flow as a percentage of the total flow. The hardwired position output signal 28 provides a direct current output voltage signal, and the position output signal 30 provides a serial data communications numerical value output signal to the BMS that it receives from remote communications control output signal 29.

In embodiments of the invention, the hardwired position output signal 28 and the position output signal 30 overcome the inherent issues present in conventional control valves of estimating the water flow position from the valve actuator position. This conventional method introduces an error because the actuator position only indicates the valve plug position and not the flow percentage, because the valve 18 water flow is not always linear relative to its position, and because there is a mechanical linkage between conventional valve actuators and valves that can introduce an error from backlash, movement hysteresis, or malfunction.

For both pressure-dependent and pressure-independent operation, the remote communications control output signal 29 receives relevant valve 18 and HVAC coil system 63 (shown in FIG. 1) data values, which may be transmitted to the BMS via the serial data communications bus. In some embodiments, this data may include the water flow information calculated by the fluid pressure and flow calculation module 25, the water temperature value provided by the valve fluid temperature sensor 22, energy information as calculated by the energy consumption calculation and retention module 24, diagnostics information received from the actuator stroke and force status module 17, diagnostic reports from the anti-cavitation control module 26, and the freeze control history from the freeze detection control module 27.

In a further embodiment, the energy consumption calculation and retention module 24 uses the auxiliary fluid temperature sensor 2, valve fluid temperature sensor 22, and flow information from the fluid pressure and flow calculation module 25 to calculate the heat energy in British Thermal Units (BTU) or kilojoules for the International System of Units, along with totalized values for energy consumption tracking. The accumulated energy information can be cleared out by the BMS so that it can remotely store the information for permanent retention. The remote communications control output signal 29 provides the position output signal 30, flow information 31, temperature information 32, and energy information 33 to the serial communications bus for remote energy reporting and retention.

In a particular embodiment, the diagnostics information module 34 provides diagnostics information received from the actuator stroke and force status module 17, including a determination as to whether the valve stroke length has changed due to debris in the valve 18 or from a mechanical linkage or valve component malfunction. This is detected by a comparison between the actuator's current operating stroke range and operating force and the initial stroke range and operating force that is retentively stored in the actuator. In an embodiment, the diagnostics information module 34 also provides diagnostic information received from the anti-cavitation control module 26 indication of the presence and duration of a cavitation condition. The freeze information module 35 provides information regarding the number of freeze occurrences and total freeze mode duration, for example, during the last seven days.

When the valve and actuator assembly 36 is setup for pressure-independent valve operation through the PI-PD mode jumper 16, the PI-PD mode selection device 15 receives its signal from the pressure-independent-mode water valve position controller 13. In a particular embodiment, the pressure-independent mode water valve position controller 13 uses inputs from the flow reset program 12, the water coil maximum flow controller 9, water coil minimum flow controller 10, and uses water flow information calculated by the fluid pressure and flow calculation module 25, and the anti-cavitation control module 26.

The flow reset program 12 converts calculated numerical position from the zone air temperature controller 8 for the linear valve stem movement actuator 14 to a calculated position to provide water flow control. As with the pressure independent algorithm, the primary control is water flow control that is determined by the room temperature setpoint. The pressure-independent-mode water valve position controller 13 has an adjustable lower proportional band, upper proportional band, proportional lower/upper shift point, and upper and lower integral and derivative settings to obtain accurate and stable flow control. The two different proportional settings are available to de-sensitize the pressure-independent flow control at higher flow rates along with an adjustable shift point that determines if the upper proportional band, upper integral setting, and upper derivative setting are active, or if the lower proportional band, lower integral setting, and lower derivative setting is active.

The proportional band acts as the gain of the control loop. A small proportional band provides a higher gain or sensitivity, and a large proportional band provides less sensitive control. The lower proportional band setting is in effect at flow rates up to the adjustable shift point of the remote maximum flow signal 4, and the upper proportional band setting is in effect at flow rates above the adjustable shift point of the maximum flow signal 4. As with all the other valve and actuator assembly 36 settings, the lower proportional band, upper proportional band, proportional band lower/upper shift point, and upper and lower integral and derivative settings are preset to values that provide stable control for the typical HVAC water systems. The integral settings provide negative or positive adjustments factors that are additive to the linear valve stem movement actuator 14 commanded position when the controlled flow does not match the flow setpoint calculated by the flow reset program 12. Also available in the pressure-independent mode water valve position controller 13 are optional derivative settings to anticipate fast changes to the room temperature to improve the HVAC system response when there are large load changes. The pressure independent mode water valve position controller 13 uses a linear output command relationship, which retains the linear plug movement valve 18 water flow curve, unless an alternate curve adjustment has been optionally setup.

The pressure-independent-mode water valve position controller 13 has a glycol content setting for specific gravity adjustment, as a glycol-water mixture has a higher specific gravity than pure water. As the specific gravity increases as a result of a higher concentration of glycol in the mixture, the water flow volume will be lower at the same linear plug movement valve 18 position than with pure water. The pressure-independent-mode water valve position controller 13 compensates for the glycol-water mixture by use of the glycol content for specific gravity adjustment.

The zone air temperature controller 8 resets the flow setpoint from a minimum to a maximum flow level. The water coil maximum flow controller 9 defines the maximum flow, which is selected to match the designed maximum flow rate of the HVAC water coil 64 (shown in FIG. 1). The water coil minimum flow controller 10 establishes the minimum flow rate for the pressure-independent flow scaling and also establishes the minimum flow rate for freeze protection. The water coil minimum flow controller 10 operates using the same freeze protection sequence as when the valve and actuator assembly 36 is configured for pressure-dependent operation. The minimum flow rate is synchronized with the building's chillers and boilers to operate them at their most efficient temperature differential.

Centrifugal chillers are designed to have their highest energy efficiency when they are fully loaded and operating at their design inlet to outlet water temperature differential. If the chillers have too low a temperature differential because the chilled water valve water flow is too high (providing a lower than ideal heat transfer) or too low a flow or no flow (causing little or no heat transfer), the chiller will operate inefficiently because the return water temperature is too low. Also one chiller operating inefficiently could require another chiller to be sequenced on requiring additional energy because both chillers are operating inefficiently. Additionally, this inefficient operation increases maintenance costs.

Mechanical heating equipment also does not operate at its designed efficiency if not fully loaded. With a condensing boiler, a higher return temperature can avoid the condensing process where the dew point of the exhaust gases cannot be met. If the boilers have too low a temperature differential because the heating valve flow is too high (providing a lower than ideal heat transfer) or too low a flow or no flow (causing little or no heat transfer), the boiler will operate inefficiently because the return water temperature is too high.

The anti-cavitation control module 26 uses the inlet valve pressure sensor 20, outlet valve pressure sensor 21, valve fluid temperature sensor 22, and the valve-specific cavitation coefficient to determine whether a cavitation condition exists, or to predict whether cavitation will occur. Since the water temperature affects the cavitation zone that is also dependent on the valve's maximum allowable pressure differential, the anti-cavitation control module 26 uses the water temperature to calculate the fluid vapor pressure, which is used with data from the inlet valve pressure sensor 20 and the outlet valve pressure sensor 21 to predict the point of incipient cavitation.

The valve-specific cavitation coefficient is unique to each valve and is based on the ratio of the external inlet to external outlet pressure differential to the internal inlet to the minimum pressure in the valve pressure differential. Generally, the valve-specific cavitation coefficient is laboratory confirmed by means of noise testing, as cavitation in a valve is usually a gradual process starting with only small portions of the valve plug 100 experiencing vapor bubbles along with the consequential noise. The glycol content is used for a vapor pressure adjustment as the vapor pressure varies with the water glycol mix as well as with the water temperature. Upon calculation of a possible cavitation condition by the anti-cavitation control module 26, the pressure-independent mode water valve position controller 13 overrides the flow reset program 12 to reduce the valve's differential pressure drop until it is out of the cavitation zone.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve and actuator assembly comprising:
   a valve configured to control a flow of liquid into a coil or heat exchanger; and
   a valve actuator configured to calculate the fluid volume flowing through the valve and control opening and closing of the valve via positioning of a valve closure member having a first position and a second position, the first position different than the second position, and further configured to provide both a maximum flow rate at the first position and a minimum flow rate for freeze protection of the liquid through the valve at the second position, the second position being between fully open and fully closed, the valve actuator having a valve closure member position sensor used to calculate the flow rate of the liquid through the valve.

2. The valve and actuator assembly of claim 1, wherein the valve actuator includes a valve flow rate meter that measures the flow rate of liquid through the valve.

3. The valve and actuator assembly of claim 2, wherein the valve has a valve body, and wherein the entire valve flow rate meter is located inside of a valve body.

4. The valve and actuator assembly of claim 1, wherein the valve actuator has a communications module configured to facilitate communication with the valve actuator over a network, the communications module configured to allow both remote monitoring of the flow through the valve, and remote control of the valve actuator.

5. The valve and actuator assembly of claim 4, wherein the valve closure member position sensor is coupled to the communications module such that data from the valve closure member position sensor can be accessed remotely.

6. The valve and actuator assembly of claim 1, wherein the valve actuator includes a zone air temperature controller that determines a position for the valve actuator based on a sensed zone temperature and a desired zone temperature, wherein the position for the valve actuator is verified based on data from the valve closure member position sensor.

7. The valve and actuator assembly of claim 6, wherein the valve actuator has a plurality of adjustable operating parameters.

8. The valve and actuator assembly of claim 7, wherein the plurality of adjustable operating parameters can be adjusted either locally or remotely.

9. The valve and actuator assembly of claim 7, wherein the plurality of adjustable operating parameters comprises an integral setting for the zone air temperature controller, wherein the integral setting provides positive or negative adjustment factors for the valve actuator to determine a correct position for the valve actuator when the actual flow rate through the valve does not match the desired flow rate through the valve.

10. The valve and actuator assembly of claim 7, wherein the plurality of adjustable operating parameters comprises a derivative setting for the zone air temperature controller, wherein the derivative setting provides positive or negative adjustment factors for the valve actuator to determine a correct position for the valve actuator in the event of an abrupt change to the flow rate through the valve.

11. The valve and actuator assembly of claim 1, wherein the valve actuator further comprises an anti-cavitation module configured to determine if the liquid flowing through the valve is likely to cavitate, wherein the anti-cavitation module determines a likelihood that cavitation in the valve will occur based on water temperature in the valve, valve inlet pressure, and valve outlet pressure, and wherein data from the valve closure member position sensor is used to adjust the flow rate of liquid through the valve to prevent cavitation.

12. The valve and actuator assembly of claim 1, wherein the valve actuator further comprises a diagnostics module configured to provide diagnostic information on operation of the valve and actuator assembly to a remote location.

13. The valve and actuator assembly of claim 12, wherein the diagnostics module provides diagnostic information regarding an actual flow rate through the valve versus a desired flow rate through the valve.

14. The valve and actuator assembly of claim 13, wherein the valve actuator is configured to retentively store the diagnostics information.

15. The valve and actuator assembly of claim 1, wherein the valve actuator further comprises a fluid temperature sensor, a valve inlet pressure sensor, and a valve outlet pressure sensor.

16. The valve and actuator assembly of claim 15, wherein data from the fluid temperature sensor, valve inlet pressure sensor, and valve outlet pressure sensor is accessible either locally or remotely.

17. The valve and actuator assembly of claim 1, wherein the valve actuator comprises:
   a motor and geartrain coupled to the throttling closure member by a linkage assembly; and
   a circuit board having control circuitry to regulate operation of the motor and geartrain, and communications circuitry to enable the actuator to communicate with a building management system via a serial communications bus.

18. The valve and actuator assembly of claim 1, wherein the valve actuator is configured to operate the valve as either a pressure-independent valve or a pressure-dependent valve.

19. A method of calculating a fluid flow rate through a valve, the method comprising the steps of:
   storing a static force or torque value for a valve closure member in a memory of a valve actuator;
   using the stored static force or torque value to calculate a value for dynamic force or torque on the valve closure member;
   determining a closure member geometry factor and storing the closure member geometry factor in the memory of the valve actuator;

determining a first valve closure member position via a valve closure member position sensor;

calculating the fluid flow rate using the dynamic force or torque value, the closure member geometry factor, and the first position;

comparing the fluid flow rate at the first position to a calculated minimum flow rate for freeze protection; and adjusting valve operation by positioning the valve closure member to a second position, the second position different than the first position and being between fully open and fully closed when the fluid flow rate at the first position is below the calculated minimum flow rate for freeze protection.

20. The method of claim 19, wherein the valve closure member moves linearly between an open position and a closed position.

21. The method of claim 20, further comprising:
calculating a closure member seating force value;
storing the closure member seating force value in the memory of the valve actuator; and
using the closure member seating force value and the static force value to calculate the dynamic force value.

22. The method of claim 19, wherein determining a closure member geometry factor comprises determining a closure member geometry factor by means of a lookup table stored in the memory of the valve actuator, or by means of a polynomial based on a variables expression of valve stem positions.

23. The method of claim 19, wherein the valve closure member moves rotationally between an open position and a closed position.

24. The method of claim 23, further comprising:
storing one or more dimensions for the valve closure member in the memory of the valve actuator;
storing a bearing friction factor in the memory of the valve actuator;
using the one or more stored dimensions, the stored bearing friction factor, and the static torque value to calculate the dynamic torque value.

25. A method of calculating a fluid flow rate through a valve, the method comprising the steps of:
determining a pressure differential between an inlet of a valve and an outlet of the valve;
calculating a flow coefficient factor based on a first position of a valve closure member;
calculating the fluid flow rate using the flow coefficient factor, and the pressure differential;
comparing the fluid flow rate at the first position to a calculated minimum flow rate for freeze protection; and
adjusting valve operation by positioning the valve closure member to a second position, the second position different than the first position and being between fully open and fully closed when the fluid flow rate is below the calculated minimum flow rate for freeze protection.

26. The method of claim 25, further comprising:
measuring a temperature of a fluid flowing through the valve;
using the temperature to determine a specific gravity of the fluid;
using the specific gravity to calculate the fluid flow rate.

* * * * *